(12) United States Patent
Fusejima et al.

(10) Patent No.: US 8,001,362 B2
(45) Date of Patent: Aug. 16, 2011

(54) PROCESSING UNIT

(75) Inventors: Atsushi Fusejima, Kawasaki (JP); Takashi Suzuki, Kawasaki (JP); Toshio Yoshida, Kawasaki (JP); Yasunobu Akizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/633,108

(22) Filed: Dec. 8, 2009

(65) Prior Publication Data
US 2010/0088491 A1    Apr. 8, 2010

Related U.S. Application Data

(63) Continuation of application No. PCT/JP2007/062445, filed on Jun. 20, 2007.

(51) Int. Cl.
*G06F 9/38* (2006.01)
*G06F 9/46* (2006.01)

(52) U.S. Cl. .................................. 712/218; 712/216

(58) Field of Classification Search .................. 712/218, 712/216
See application file for complete search history.

(56) References Cited

U.S. PATENT DOCUMENTS

| | | | |
|---|---|---|---|
| 6,052,709 A | 4/2000 | Paul | |
| 6,076,157 A * | 6/2000 | Borkenhagen et al. | 712/228 |
| 6,535,905 B1 * | 3/2003 | Kalafatis et al. | 718/108 |
| 2004/0210743 A1 | 10/2004 | Burky et al. | |
| 2004/0216113 A1 | 10/2004 | Armstrong et al. | |
| 2005/0030831 A1 * | 2/2005 | Terzioglu et al. | 365/232 |
| 2005/0138333 A1 | 6/2005 | Samra | |
| 2005/0183065 A1 | 8/2005 | Wolczko et al. | |
| 2005/0240752 A1 * | 10/2005 | Yokoi et al. | 712/1 |
| 2005/0240930 A1 * | 10/2005 | Amamiya et al. | 718/100 |

FOREIGN PATENT DOCUMENTS

| | | |
|---|---|---|
| JP | 10-275100 | 10/1998 |
| JP | 2000-339157 | 12/2000 |
| JP | 2004-326765 | 11/2004 |
| JP | 2006-040174 | 2/2006 |

OTHER PUBLICATIONS

European Search Report dated Nov. 10, 2010 and issued in corresponding European Patent Application 07767283.0.

* cited by examiner

*Primary Examiner* — Daniel Pan
(74) *Attorney, Agent, or Firm* — Staas & Halsey LLP

(57) ABSTRACT

A processing unit includes a plurality of thread execution units each provided with a performance analysis circuit for measuring various types of events resulting from execution of instructions and a commit stack entry unit for controlling the completion of executed instructions and each executing a thread having a plurality of instructions, a commit scope register for storing instructions of completion candidates stored in each commit stack entry unit by execution by each thread execution unit and performing processing for completion of instructions included in the thread, and a thread selecting means for sending commit events of the instructions to a performance analysis circuit provided in each thread execution unit corresponding to the instructions when performing commit processing for instructions stored in the commit scope register.

9 Claims, 19 Drawing Sheets

PROCESSING UNIT

CROSS-REFERENCE TO RELATED APPLICATIONS

This application is a continuation application and is based upon the International Application No. PCT/JP2007/062445, filed on Jun. 20, 2007.

FIELD

The present invention relates to a processing unit for executing a plurality of threads each having a plurality of instructions, more particularly relates to a processing unit provided with the function of simultaneous multithreading (usually abbreviated as "SMT") where a plurality of threads sharing a cache memory, arithmetic logic units, or other resources are simultaneously executed.

A processing unit, for example, a processor, provided with a function of simultaneous multithreading desirably can measure the number of executed instructions and other various types of events for each thread and can analyze an average value of the number of clock cycles required for completion of one instruction of a program in a plurality of threads as one of the indicators of the performance of a processor (usually abbreviated as "CPI (cycles per instructions)").

BACKGROUND

When using a processor to execute a plurality of threads, the practice has been to use a single thread processor of a single thread type to sequentially execute the instructions of one thread each clock cycle. This single thread processor sends instructions from a primary instruction cache memory to an instruction decoder. Further, it registers all instructions decoded by the instruction decoder in a commit stack entry unit (usually abbreviated as "CSE") and simultaneously registers them at reservation stations (usually abbreviated as "RS") for controlling execution out of order. It reads out from a register the instructions which can be executed by the priority cycle of the RS's by a buffer cycle so as to load them into the arithmetic logic units and execute the operations by the operation execution cycle.

The results of execution of such operations are stored by a register update cycle in an update buffer where instruction end ("commit") processing is awaited. Commit processing is performed in order upon receiving reports of end of execution of operations, end of transfer of data from the primary data cache memory, end of branch judgment from the branch prediction mechanism, etc. Further, the processor writes these results by the register write cycle from the update buffer in the register and updates the program counter (usually abbreviated as "PC") and next program counter (NEXT PC). A single thread processor is usually provided with a performance analysis (usually abbreviated as "PA") circuit having the function of dynamically analyzing the number of instruction executions and the state of occurrence of other events and the frequency of usage of resources. This performance analysis circuit selects the type of events sent from the parts of the processor by software and counts and stores the selected events. The stored events can be read out by software after the end of analysis and the combination of events used for evaluation of the performance of the processor. A conventional single thread processor registers the instructions of one thread in the CSE, registers commit candidates of one thread selected by a pointer selection circuit representing a head entry of the CSE every clock cycle in a commit scope register, and performs commit processing.

As one indicator of performance of a processor, the value of the CPI (Cycle Per Instruction) representing the average value of the number of clock cycles required for completion of one instruction of a program may be mentioned. This value of CPI is found by dividing the number of cycles by the number of executed instructions. If viewing the value of CPI from the perspective of the commit processing, when a number of instructions can be ended in a simultaneous clock cycle, for example, four instructions can be simultaneously committed, the CPI becomes the result of dividing the number of cycles measured for each commit event, that is, 0 end-op (end of zero operations), 1 end-op (end of one operation), 2 end-op (end of two operations), 3 end-op (end of three operations), and 4 end-op (end of four operations), by the number of executed instructions and cumulatively adding the values. In particular, in the case of 0 end-op, this indicates the commit processing of the head instruction (usually abbreviated as "TOQ" (Top of Queue)) in in-order commit processing was not possible. In this case, commit processing of the next instruction is also not possible, so analysis of 0 end-op and analysis of the factors of the same, that is, EU comp-wait (waiting for completion of operation), BR comp-wait (waiting for completion of branching), FCH comp-wait (waiting for completion of forwarding of data from cache memory), CSE empty (state of nothing registered in the commit stack entry unit), etc. become important. The factors of the CPI and the factors of 0 end-op can all be obtained as events from the commit scope register. Further, for the factors of 0 end-op, events are always obtained limited to one factor for each clock cycle. With a single thread processor, there is only one thread, so the factors of the CPI could be easily analyzed by analyzing the events of the one thread sent out from the commit scope register by the performance analysis circuit and cumulatively adding the factors.

In this regard, to improve the efficiency of use of resources required for execution of instructions by the processor such as the cache memory, pipeline, and arithmetic logic units and draw out the maximum performance of the processor, the technique of "multithreading" is generally known. Multithreading includes "simultaneous multithreading (SMT)" having the function of simultaneously executing a plurality of threads. In this simultaneous multithreading, two or more threads are simultaneously executed and instructions of the threads are registered in the commit stack entry unit. By copying into a commit scope register limited to one or more threads like a single thread the entries of commit candidates of threads alternately selected by the thread selection circuit for example each clock cycle, commit processing is performed. Performance is analyzed by the performance analysis circuit of each thread.

In this simultaneous multithreading, in the same way as the above-mentioned single thread method, it is desirable to analyze the factors of the CPI, that is, 0 end-op (end of zero operations), 1 end-op (end of one zero operation), 2 end-op (end of two operations), 3 end-op (end of three operations), and 4 end-op (end of four operations) and the factors of the 0 end-op (end of zero operations), for each thread. The commit stack entry unit has a plurality of threads registered in it, but the commit scope register has registered in it only the commit candidates of the commit scope register limited to part of the threads selected by the thread selection circuit for each clock cycle. Accordingly, the commit scope register performs commit processing for only the partially limited threads. Further, the events of the selected threads are sent from the commit scope register to the performance analysis circuits. However, in this case, events from the not selected threads are not analyzed. In simultaneous multithreading as well, in the same way as the single thread method, the CPI is analyzed accurately for each thread, so it is necessary to simultaneously analyze the events of all of the threads (first problem).

Further, on the other hand, in simultaneous multithreading, it is desirable to analyze the CPI when combining a plurality of threads in a core comprised of a plurality of threads. In this simultaneous multithreading, by executing a plurality of threads, it becomes possible to improve the efficiency of use with a core over the case of execution of only single threads. As one example, in a clock cycle in which all threads have no instruction commits, the processing as a core also has no instruction commits, but in a clock cycle in which one thread has no instruction commits, if the other threads have for example four instruction simultaneous commits, the processing as a core has four instruction simultaneous commits. Here, in a performance analysis circuit for analysis of the CPI of a core comprised of a plurality of threads, the 1 end-op (end of one operation), 2 end-op (end of two operations), 3 end-op (end of three operations), and 4 end-op (end of four operations) are independent for each thread, so can be accurately analyzed, but 0 end-op (end of zero operations) ends up being detected even when not registered in the commit scope register. Due to this, with this method of analysis, it is not possible to accurately analyze the CPI of processing of a combination of a plurality of threads of a core. Accordingly, in simultaneous multithreading, even for a core comprised of a plurality of threads, to accurately analyze the CPI of all threads, it is necessary to accurately analyze events of 0 end-op (end of zero operations) (second problem).

Here, for reference, the following Patent Literature 1 and Patent Literature 2 relating to conventional multithreading are presented as prior art literature.

Patent Literature 1 discloses a performance monitoring system supporting independent monitoring of performance for each of a plurality of parallel threads supported by a processor.

However, in Patent Literature 1, for example, two parallel threads are executed by VMT (Vertical Multi-Threading) where the active states and inactive states of two parallel threads are switched at different timings. Due to this, two parallel threads are not simultaneously executed like in simultaneous multithreading, so the above problems never occur.

Patent Literature 2 discloses a device and method for changing the selection of instruction threads when selecting instruction threads in a multithread processor. However, Patent Literature 2 does not allude at all to the configuration and operation of a simultaneous multithreading type processor.

Therefore, neither of Patent Literature 1 and Patent Literature 2 can deal with the problems arising due to the conventional simultaneous multithreading.

Patent Literature 1 is Japanese Laid-open Patent Publication No. 10-275100. Patent Literature 2 is Japanese Laid-open Patent Publication No. 2004-326765.

Note that, the configuration of a conventional single thread processor and the problems in simultaneous multithreading will be explained in detail later with reference to the drawings.

SUMMARY

An object of the present invention is to provide a processing unit of a simultaneous multithreading type where a plurality of threads are simultaneously executed which enables accurate analysis of the CPI for each thread by accurately analyzing all events, including events from not selected threads, and accurately analyzing events of factors due to which instructions could not be completed for a core comprised of a plurality of threads.

To achieve the above object, a first aspect of the present invention provides a processing unit including a plurality of thread execution units each provided with a performance analysis circuit for measuring various types of events resulting from execution of instructions and a commit stack entry unit for controlling the completion of executed instructions and each executing a thread having a plurality of instructions, a commit scope register for storing instructions of completion candidates stored in each commit stack entry unit by execution by each thread execution unit and performing processing for completion of instructions included in the thread, and a thread selecting means for sending commit events of the instructions to a performance analysis circuit provided in each thread execution unit corresponding to the instructions when performing commit processing for instructions stored in the commit scope register.

Preferably, in the processing unit of the first aspect of the present invention, the thread selecting means sends an instruction incompletion event representing the fact that an instruction could not be completed to the performance analysis circuit provided in the thread execution unit corresponding to the instruction when, despite being executed by the thread execution unit, the instruction executed by the thread execution unit could not be stored in the commit scope register.

Furthermore, preferably, the processing unit of the first aspect of the present invention is provided with, for each thread, a register for holding a factor of only when a head instruction could not be completed by a completion processing of the instruction and simultaneously sends an event of a factor due to which the head instruction of the thread stored in the commit scope register could not be completed and an event of a factor stored in a register holding a factor of only when a head instruction of another thread could not be completed to the performance analysis circuit for each thread so as to thereby analyze the factor due to which the head instruction of the thread could not be completed.

Furthermore, preferably, in the processing unit of the first second of the present invention, the circuit generating an event of a factor due to which the head instruction of the thread stored in the commit scope register could not be completed and an event of a factor stored in a register holding a factor of only when a head instruction of another thread could not be completed is comprised of a combination of a plurality of logic devices.

Further, on the other hand, a second aspect of the present invention provides a processing unit including a plurality of thread execution units each provided with a performance analysis circuit for measuring various types of events resulting from execution of instructions of a core comprised of a plurality of threads and a commit stack entry unit for controlling the completion of executed instructions and each executing a plurality of threads in the core having a plurality of instructions, a commit scope register for storing instructions of completion candidates stored in each commit stack entry unit by execution by each thread execution unit and performing processing for completion of instructions included in one limited thread, and a thread selecting means for sending commit events of the instructions to a performance analysis circuit provided in each thread execution unit corresponding to the instructions when performing commit processing for instructions stored in the commit scope register.

Preferably, in the processing unit of the second aspect of the present invention, the thread selecting means sends an instruction incompletion event representing the fact that an instruction could not be completed to the performance analysis circuit provided in the thread execution unit corresponding to the instruction when, despite being executed by the thread execution unit, the instruction executed by the thread execution unit could not be stored in the commit scope register.

Furthermore, preferably, the processing unit of the third second of the present invention is provided with, for each thread, a register for holding a factor of only when a head instruction could not be completed by a completion processing of the instruction and sends an event of a factor due to which the head instruction of the thread stored in the commit scope register could not be completed to the performance analysis circuit so as to thereby analyze the factor due to which the head instruction of the thread could not be completed.

Furthermore, preferably, in the processing unit of the second aspect of the present invention, the circuit generating an event of a factor due to which the head instruction of the thread stored in the commit scope register could not be completed is comprised of a combination of a plurality of logic devices.

Further, on the other hand, the processing unit of the third aspect of the present invention has a plurality of first thread execution units each provided with a first performance analysis circuit for measuring various types of events resulting from execution of instructions and a first commit stack entry unit for controlling the completion of executed instructions and each executing a thread having a plurality of instructions, a first commit scope register for storing instructions of completion candidates stored in each first commit stack entry unit by execution by each first thread execution unit and performing processing for completion of instructions included in the thread, and a first thread selecting means for sending commit events of the instructions to a first performance analysis circuit provided in each first thread execution unit corresponding to the instructions when performing commit processing for instructions stored in the first commit scope register.

Furthermore, the processing unit of the third aspect of the present invention has a plurality of second thread execution units each provided with a second performance analysis circuit for measuring various types of events resulting from execution of instructions of a core comprised of a plurality of threads and a second commit stack entry unit for controlling the completion of executed instructions and each executing a plurality of threads in the core having a plurality of instructions, a second commit scope register for storing instructions of completion candidates stored in each second commit stack entry unit by execution by each second thread execution unit and performing processing for completion of instructions included in one limited thread, and a second thread selecting means for sending commit events of the instructions to a second performance analysis circuit provided in each second thread execution unit corresponding to the instructions when performing commit processing for instructions stored in the second commit scope register.

Preferably, in the processing unit of the third aspect of the present invention, the first thread selecting means sends an instruction incompletion event representing the fact that an instruction could not be completed to the first performance analysis circuit provided in the first thread execution unit corresponding to the instruction when, despite being executed by the first thread execution unit, the instruction executed by the first thread execution unit could not be stored in the first commit scope register, while the second thread selecting means sends an instruction incompletion event representing the fact that an instruction could not be completed to the second performance analysis circuit provided in the second thread execution unit corresponding to the instruction when, despite being executed by the second thread execution unit, the instruction executed by the second thread execution unit could not be stored in the second commit scope register.

In short, according to the processing unit of the first aspect of the present invention, when simultaneously multithreading etc. is executed by a plurality of threads, commit events of threads stored in the commit scope register at the time of commit processing are analyzed by a performance analysis circuit for each thread, even for threads not stored in the commit scope register, events representing that an instruction could not be completed are measured by a performance analysis circuit for each thread, and all events are simultaneously measured for all threads, so it becomes possible to accurately analyze the CPI for each thread and suitably evaluate the performance of the processor.

Furthermore, according to the processing unit of the second aspect of the present invention, when simultaneously multithreading etc. is executed by a core comprised of a plurality of threads, commit events stored in a commit scope register limited to one thread are analyzed by only the performance analysis circuit of the selected single thread and events representing that an instruction could not be completed are not analyzed by the performance analysis circuits of other not selected threads, so it is possible to accurately analyze an event of a factor due to which an instruction could not be completed and accurately analyze the CPI for a core comprised of a plurality of threads.

Furthermore, according to the processing unit of the third aspect of the present invention, it becomes possible to simultaneously analyze all events for all threads and possible to analyze an event of a factor due to which instructions could not be completed for a core comprised of a plurality of threads.

BRIEF DESCRIPTION OF DRAWINGS

The present invention will be explained next with reference to the attached drawings. Here.

DESCRIPTION OF EMBODIMENTS

First, before explaining the configuration and operation of a processing unit having the function of SMT (simultaneous multithreading) according to an embodiment of the present invention, the configuration of a conventional single thread processor and the problems in simultaneous multithreading unit will be explained in detail with reference to the attached drawings (FIG. 1 to FIG. 7).

Figure 1:
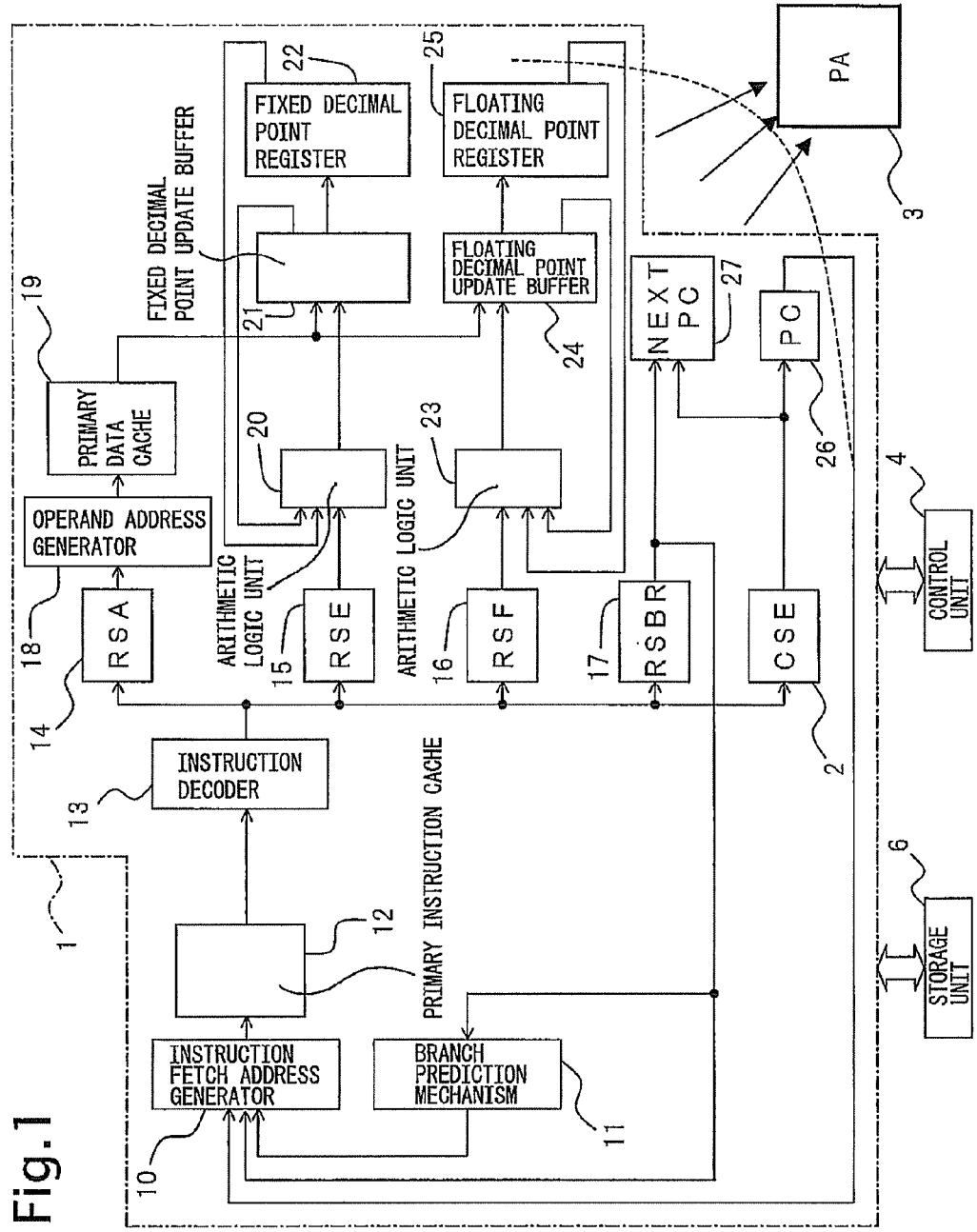
FIG. 1 is a block diagram illustrating the overall configuration of a conventional single thread processor.
Figure 2:
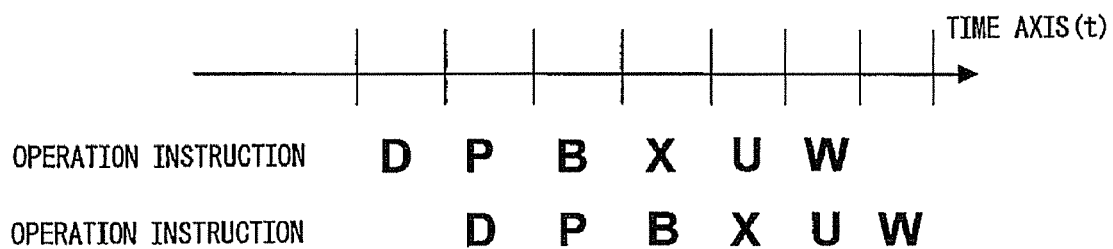
FIG. 2 is a view illustrating a single thread type pipeline.

FIG. 1 is a block diagram illustrating the overall configuration of a conventional single thread processor, while FIG. 2 is a view illustrating a single thread type pipeline. Note that, after this, components similar to the ones explained above will be expressed with the same reference notations attached. The conventional single thread processor of FIG. 1 is provided with a processing unit 1 for processing various types of instructions and data, a control unit 4 controlling overall the operations of the parts of the processing unit 1, and a memory 6 storing programs and related data for execution of the processing by the processing unit 1.

Here, the processing unit 1 has an instruction fetch address generator 10 for generating instruction fetch addresses, a primary instruction cache memory 12 for temporarily storing instructions sent from the instruction fetch address generator 10, and an instruction decoder 13 for decoding instructions sent from the primary instruction cache memory 12.

Furthermore, the processing unit 1 has a commit stack entry unit (CSE) 2 for registering all instructions decoded by the instruction decoder 13 and various types of reservation stations (RS) for temporarily storing these instructions. These reservation stations, for example, include an RSA (Reservation Station for Address Generator) 14 for temporarily holding addresses of instructions, an RSE (Reservation Station for Execute) 15 for calculating a fixed decimal point of data, an RSF (Reservation Station for Execute) 16 for calculating a floating decimal point of data, and an RSBR (Reservation Station for Branch) 17 for branch instructions.

Furthermore, the processing unit 1 has an operand address generator 18 and primary data cache memory 19 for processing addresses of instructions sent from the RSA 14, an arithmetic logic unit 20 for executing a fixed decimal point operation of data sent from the RSE 15, a fixed decimal point update buffer 21 and fixed decimal point register 22, an arithmetic logic unit 23 for executing a floating decimal point operation of data sent from the RSF 16, a floating decimal point update buffer 24 and floating decimal point register 25, and a branch prediction mechanism 11 for branch judgment of a branch instruction sent from the RSBR 17.

Furthermore, the processing unit 1 has a program counter (PC) 26 for counting instructions of a current plurality of threads and a next program counter (NEXT PC) 27 for counting instructions of a next plurality of threads.

When using the single thread processor of FIG. 1 to execute a plurality of threads, in the past, as illustrated in FIG. 2, the practice has been to sequentially execute the instructions of one thread every clock cycle (time axis (t)). This single thread processor, first, sends instructions from the primary instruction cache memory 12 to the instruction decoder 13. Next, it decodes them in order at the decode (D) cycle. Further, it registers all instructions decoded by the instruction decoder 13 in the commit stack entry unit (CSE) 2 and simultaneously registers these in the individual RS's for controlling execution of instructions out of order. It reads out instructions which can be instructed in a priority (P) cycle of the RS from a register (for example, a fixed decimal point register 22 or floating decimal point register 25) by a buffer (B) cycle, loads them out of order to the arithmetic logic units 20 and 23, and executes them by the operation execution (X) cycle.

The results of execution of this operation are stored by a register update (U) cycle in an update buffer (for example, fixed decimal point update buffer 21 or floating decimal point update buffer 24), commit (commit processing) is awaited, and commit processing is performed in order upon receiving reports of end of execution of operations at the CSE 2, end of transfer of data from the primary data cache memory 19, end of branch judgment from the branch prediction mechanism 11, etc. Further, it writes these by the register write (W) cycle from the update buffer in the register and updates the program counter (PC) and next program counter (NEXT PC). A single thread processor is usually provided with a performance analysis (PA) circuit 3 having the function of dynamically measuring the number of instruction executions and the state of occurrence of other events and the frequency of usage of resources. This performance analysis circuit 3 selects the type of events sent from the parts of the single thread processor by software and counts and stores the selected events. The stored events can be read out by software after the end of measurement and used for evaluation of the performance of the processor based on the combination of events.

Figure 3:
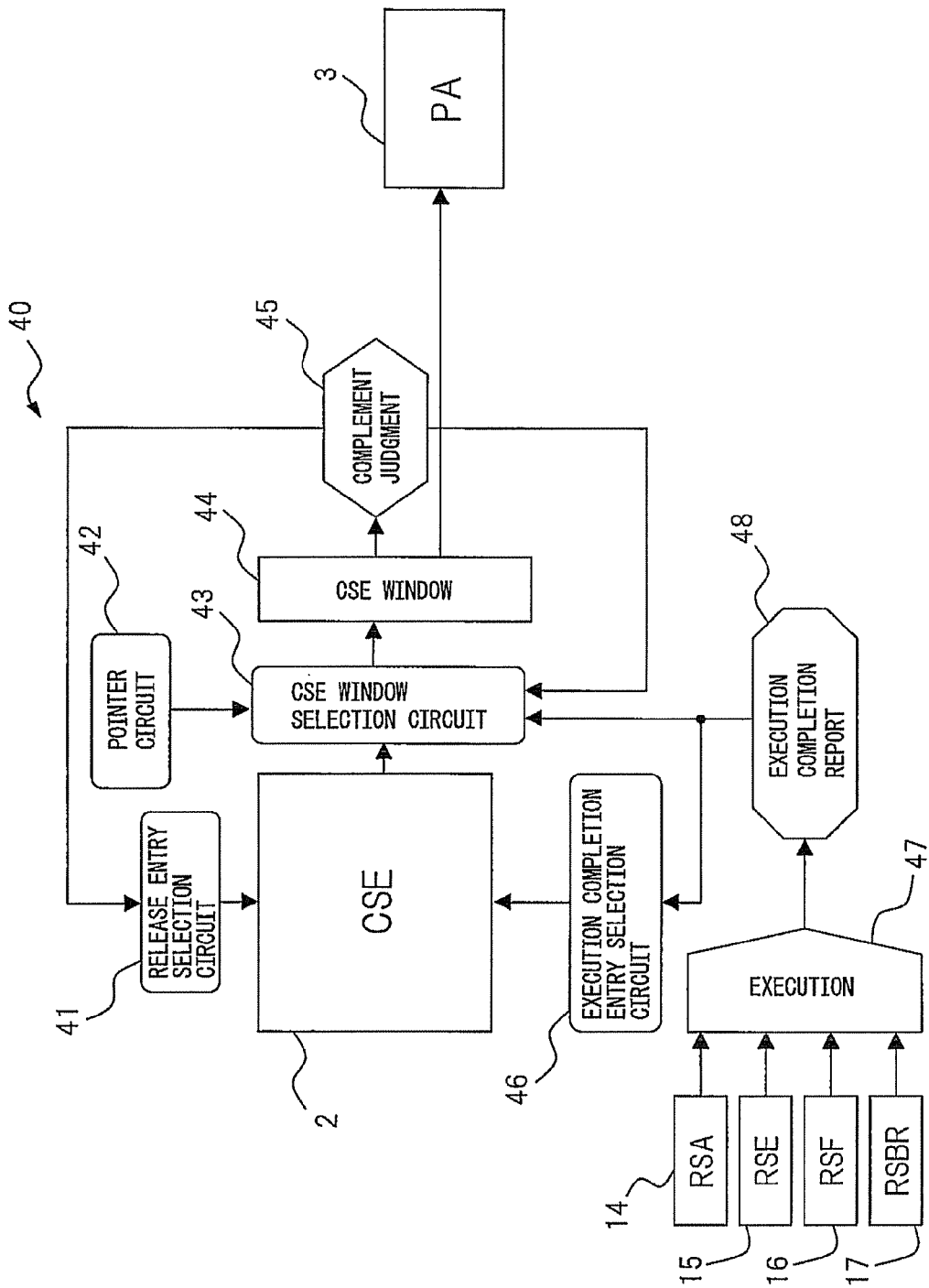
FIG. 3 is a block diagram illustrating the configuration of a single thread type commit control unit.

FIG. 3 is a block diagram illustrating the configuration of a single thread type commit control unit. Here, the configuration of the commit control unit 40 included in the control unit 4 of FIG. 1 will be simply illustrated. In the commit control unit 40 of FIG. 3, instructions of one thread are registered in the CSE 2. Furthermore, the commit control unit 40 of FIG. 3 is provided with a released entry selection circuit 41 illustrating a head entry of the CSE 2 for each clock cycle and an execution completion entry selection circuit 46 illustrating the entries of execution completion events of the CSE 2 for each clock cycle. Furthermore, the commit control unit 40 of FIG. 3 is provided with a commit scope register selection circuit for selecting a thread having commit events (CSE window selection circuit 43) and a commit scope register for registering commit events of the selected thread (CSE window 44). The results of execution when executing operations at the RSA 14, RSE 15, RSF 16, and RSBR 17 (execution block 47) are notified from an execution completion report block 48 to the execution completion entry selection circuit 46.

In the conventional single thread processor, instructions of one thread are registered in the CSE 2 and the commit candidates of one thread selected by a pointer circuit 42 illustrating the head entry of the CSE 2 each clock cycle are registered in the commit scope register (CSE window 44) whereby commit processing is performed. For the data registered in the CSE 2, a completion judgment block 45 for judging if commit processing has been completed or not is provided. The performance analysis (PA) circuit 3 analyzes events sent from the CSE window 44 to find the factors of the CPI.

Figure 4:
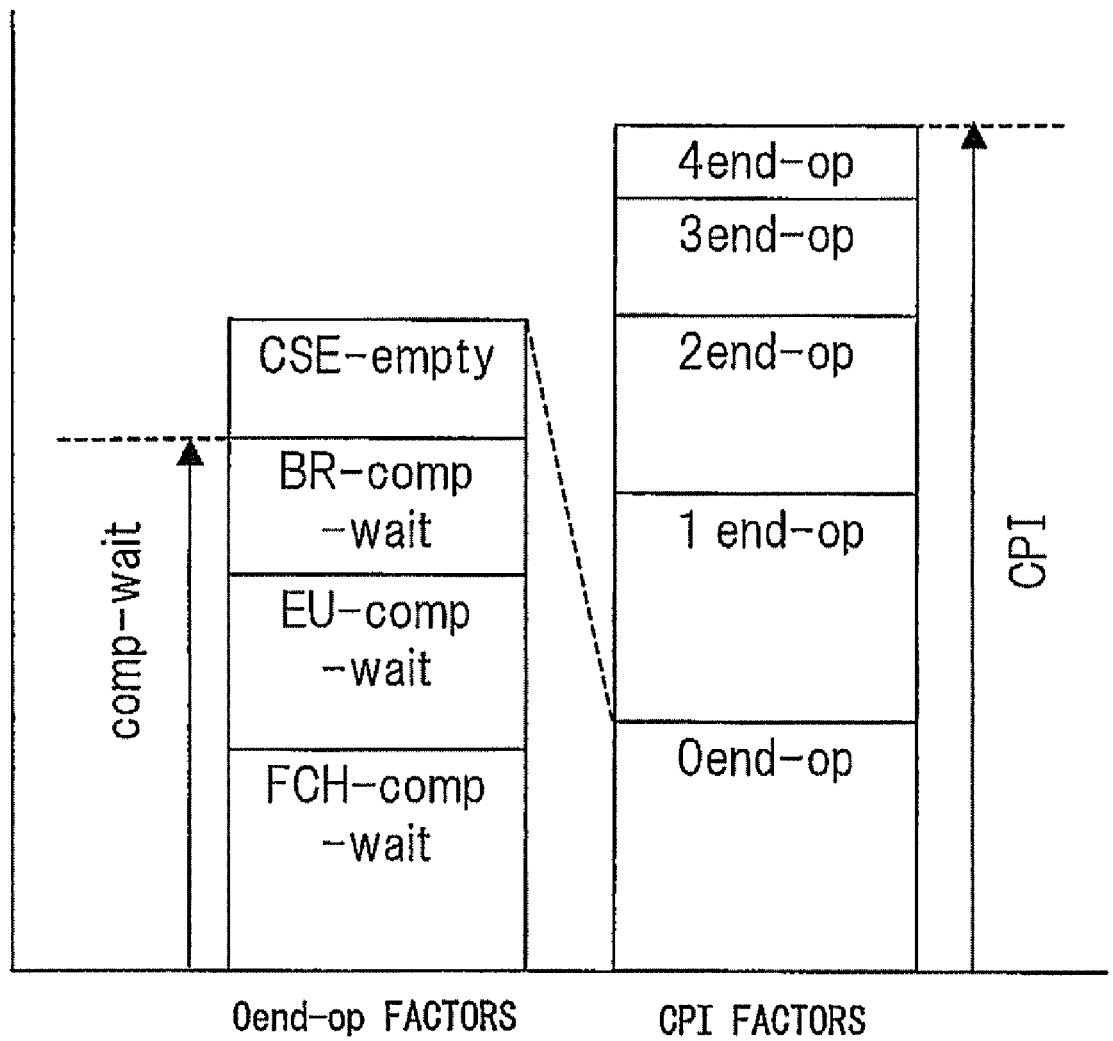
FIG. 4 is a view illustrating reasons for a single thread type CPI.

FIG. 4 is a view illustrating factors of a single thread type CPI. The value of the CPI used as one indicator of performance of a processor is found by dividing the number of cycles by the number of executed instructions. If viewing the value of CPI from the perspective of the commit processing, when a number of instructions can be ended in a simultaneous clock cycle, for example, four instructions can be simultaneously committed, the CPI becomes the result of dividing the number of cycles measured for each commit event, that is, 0 end-op (end of zero operations), 1 end-op (end of one operation), 2 end-op (end of two operations), 3 end-op (end of three operations), and 4 end-op (end of four operations), by the number of executed instructions and cumulatively adding the values. In particular, in the case of 0 end-op, this indicates the commit processing of the head instruction (usually abbreviated as "TOQ" (Top of Queue)) in in-order commit processing was not possible. In this case, commit processing of the next instruction is also not possible, so analysis of 0 end-op and analysis of the factors of the same, that is, EU comp-wait (waiting for completion of operation), BR comp-wait (waiting for completion of branching), FCH comp-wait (waiting for completion of forwarding of data from cache memory), CSE empty (state of nothing registered in the commit stack entry unit), etc. become important. The factors of the CPI and the factors of 0 end-op can all be obtained as events from the commit scope register. Further, for the factors of 0 end-op, events are always obtained limited to one factor for each clock cycle. With a single thread processor, there is only one thread, so the factors of the CPI could be easily analyzed by analyzing the events of the one thread sent out from the commit scope register by the performance analysis circuit and cumulatively adding the factors.

Figure 5:
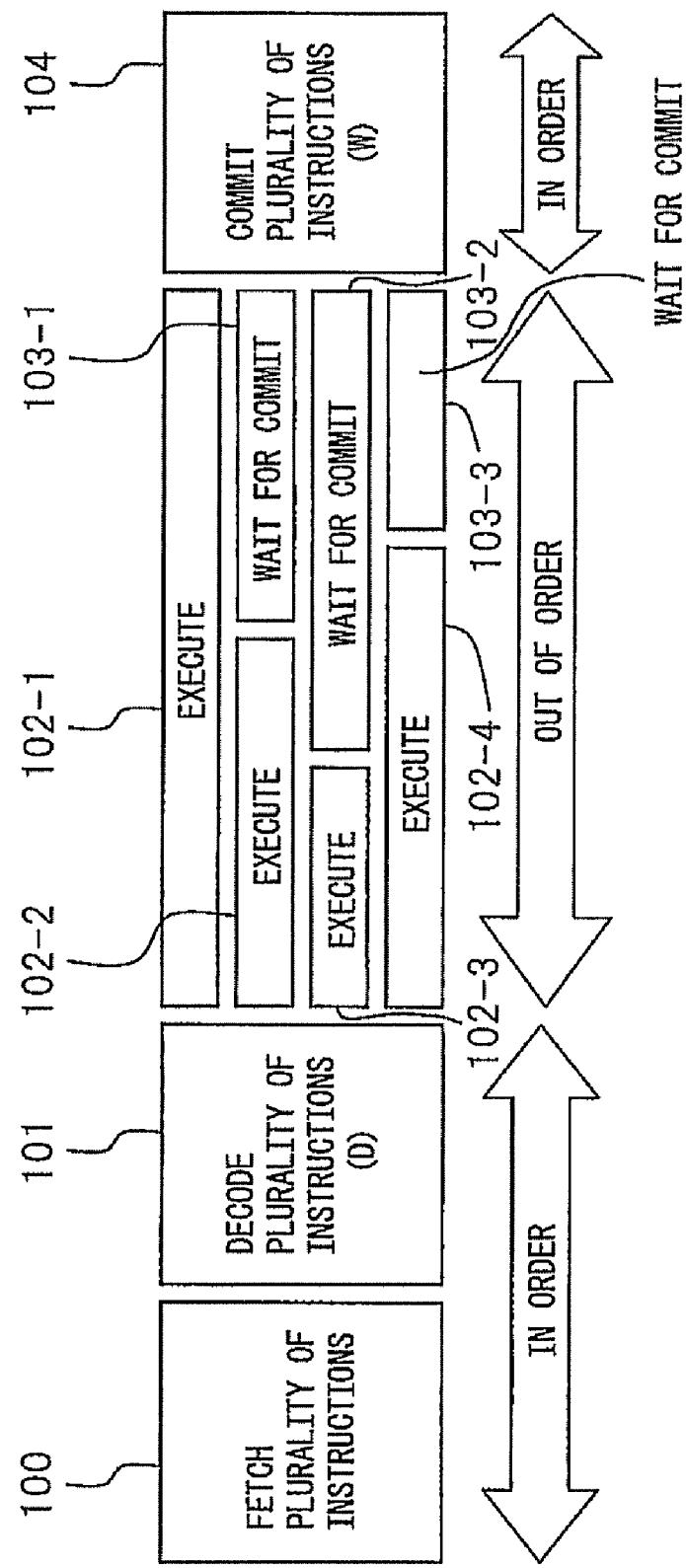
FIG. 5 is a flow chart illustrating a general super scalar/out-of-order processing.
Figure 6:
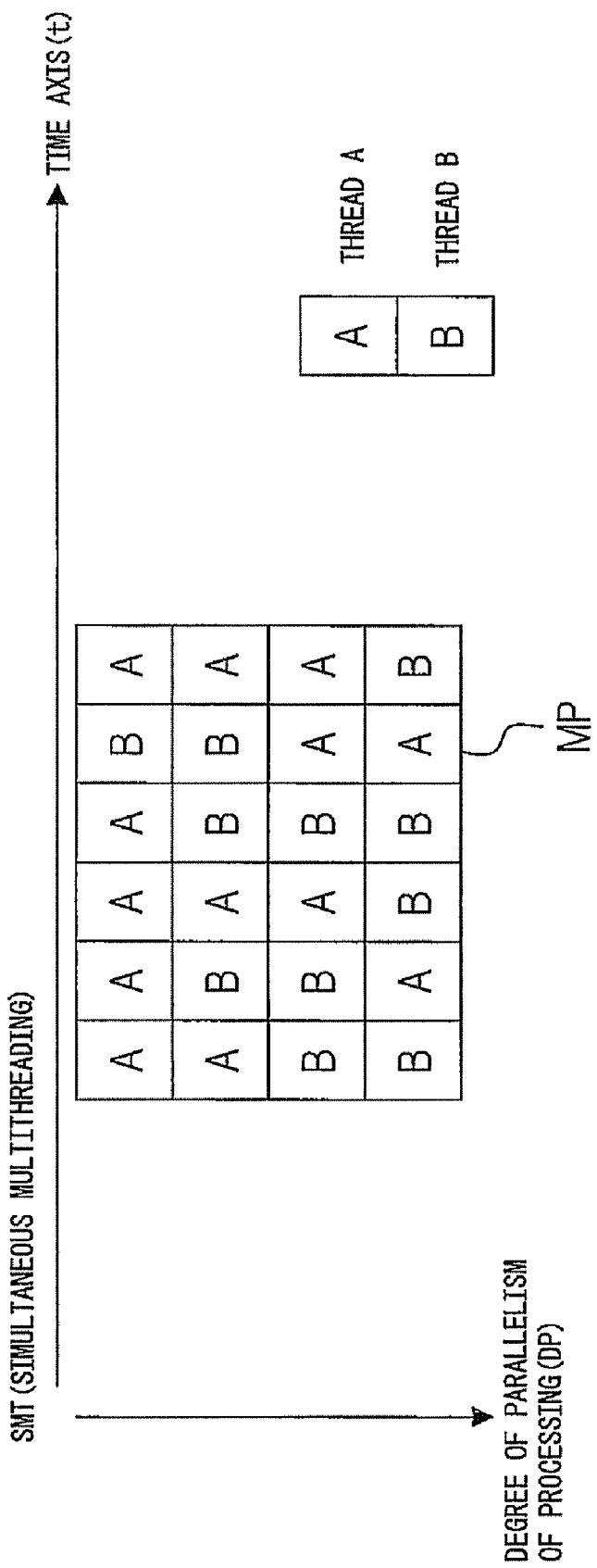
FIG. 6 is a view conceptually illustrating simultaneous multithreading.
Figure 7:
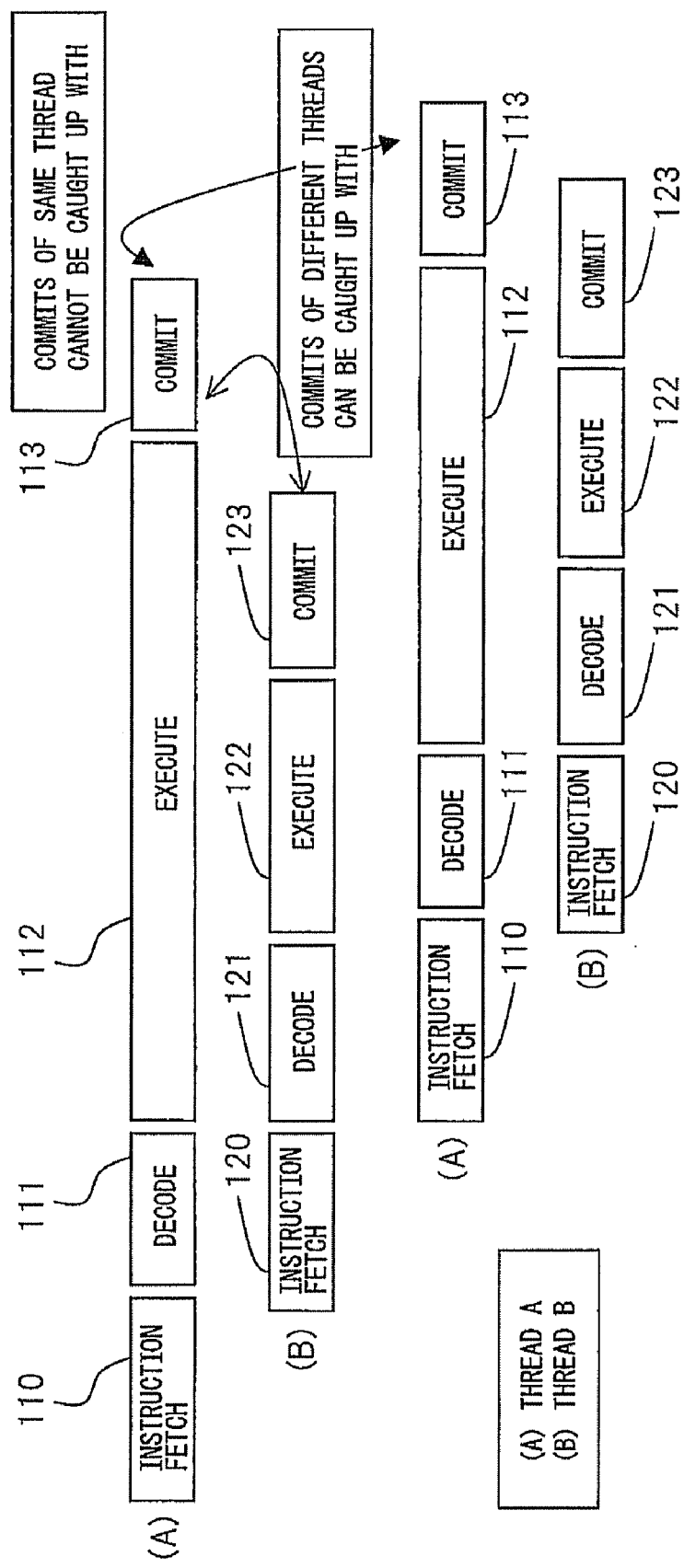
FIG. 7 is a flowchart illustrating processing by simultaneous multithreading.

FIG. 5 is a flow chart illustrating a general super scalar/out-of-order processing, FIG. 6 is a view conceptually illustrating simultaneous multithreading, and FIG. 7 is a flowchart illustrating processing by simultaneous multithreading.

In the super scalar/out-of-order processing of FIG. 5, a plurality of instruction fetch cycles 100, a plurality of instruction decode (D) cycles 101, and commits (W) of a plurality of instructions 104 are processed in order. Further, on the other hand, the plurality of instructions decoded by the plurality of instruction decode (D) cycles 101 are individually executed out of order (plurality of execution cycles 102-1, 102-2, 102-3, and 102-4). When executing this plurality of execution cycles 102-1 to 102-4, commit waits 103-1, 103-2, and 103-3 occur. To reduce occurrence of commit waits as much as possible, simultaneous multithreading (SMT) having the function of simultaneously executing a plurality of threads (execution cycles) is employed. In this simultaneous multithreading, two or more threads are simultaneously executed and instructions of the threads are registered in the CSE. By copying into a commit scope register (CSE window) limited to one or more threads like a single thread the entries of commit candidates of threads alternately selected for each clock cycle, commit processing is performed. Performance of each thread is analyzed by the performance analysis circuit.

With this SMT, as clear from the blocks MP illustrated by the relationship of the time axis (t) and degree of parallelism of processing of FIG. 6, a plurality of threads (for example thread A and thread B) are simultaneously executed at each clock cycle.

Furthermore, in the processing by SMT of FIG. 7, the instruction fetch cycle 110, decode cycle 111, execute cycle 112, and commit cycle 113 of the thread A and the instruction fetch cycle 120, decode cycle 121, execute cycle 122, and commit cycle 123 of the thread B are simultaneously executed. Here, it should be noted that it is not possible to catch up with the commits of the same thread, but it is possible to catch up with the commits of different threads.

In the SMT illustrated in FIG. 6 and FIG. 7, a plurality of threads are registered in the CSE, but the commit scope register registers only commit candidates of the commit scope register selected by the thread selection circuit for each clock cycle. Accordingly, the commit scope register performs only the commit processing of the selected thread. Further, the events of the selected thread are sent from the commit scope register to the performance analysis circuit. However, as explained above, it is not possible to analyze events from a not selected thread. In simultaneous multithreading as well, to accurately analyze the CPI for each thread, it is necessary to simultaneously analyze the events for all threads (first inconvenient situation).

Further, on the other hand, with SMT, it is desirable to analyze the CPI when combining a plurality of threads in a core comprised of a plurality of threads. In this simultaneous multithreading, by executing a plurality of threads, it becomes possible to improve the efficiency of use with a core compared with the case of execution by just single threads. In this case, in a performance analysis circuit for analyzing the CPI of a core comprised of a plurality of threads, 1 end-op (end of one operation), 2 end-op (end of two operations), 3 end-op (end of three operations), and 4 end-op (end of four operations) are independent for each thread, so accurate measurement is possible, but measurement ends up being performed even when 0 end-op (end of zero operations) is not registered in a single limited commit scope register. For this reason, with such a measurement method, it is not possible to accurately analyze the CPI of processing combining a plurality of threads in a core. Accordingly, in simultaneous multithreading, to accurately analyze the CPI for all threads even for a core comprised of a plurality of threads, it becomes necessary to accurately analyze events of the 0 end-op (end of zero operations) (second inconvenient situation).

Next, the configuration and operation of an SMT type processing unit according to an embodiment of the present invention devised for dealing with the above first and second inconvenient situations will be explained in detail with reference to the attached drawings (FIG. 8 to FIG. 20).

Figure 8:
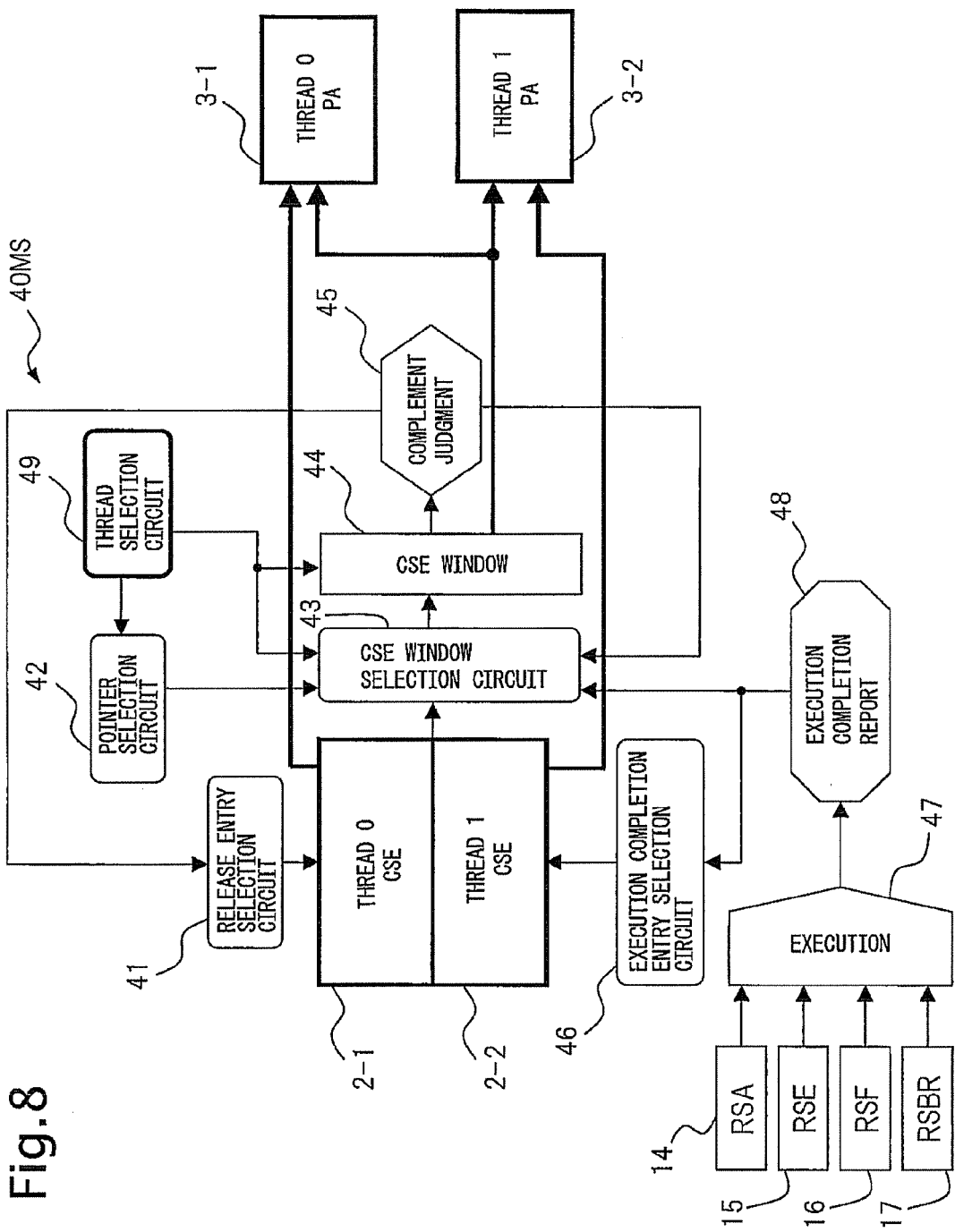
FIG. 8 is a block diagram illustrating the configuration of a simultaneous multithreading type commit control unit (thread measurement) according to the present invention.
Figure 9:
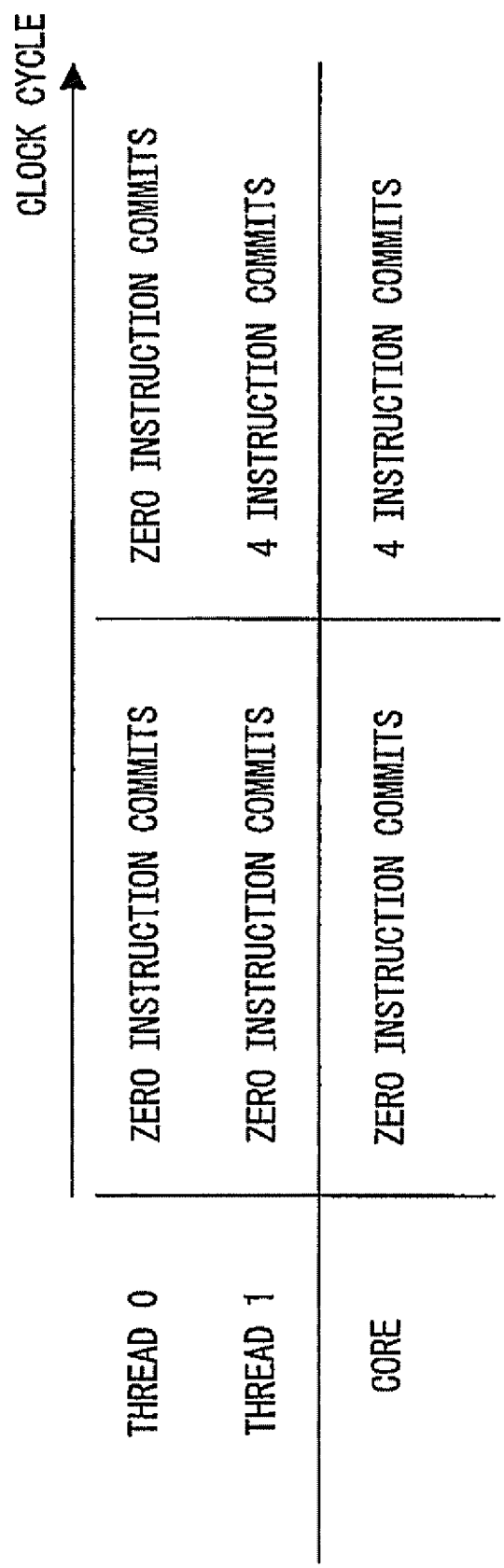
FIG. 9 is a view illustrating the way of viewing the number of instruction commits of a core.
Figure 10:
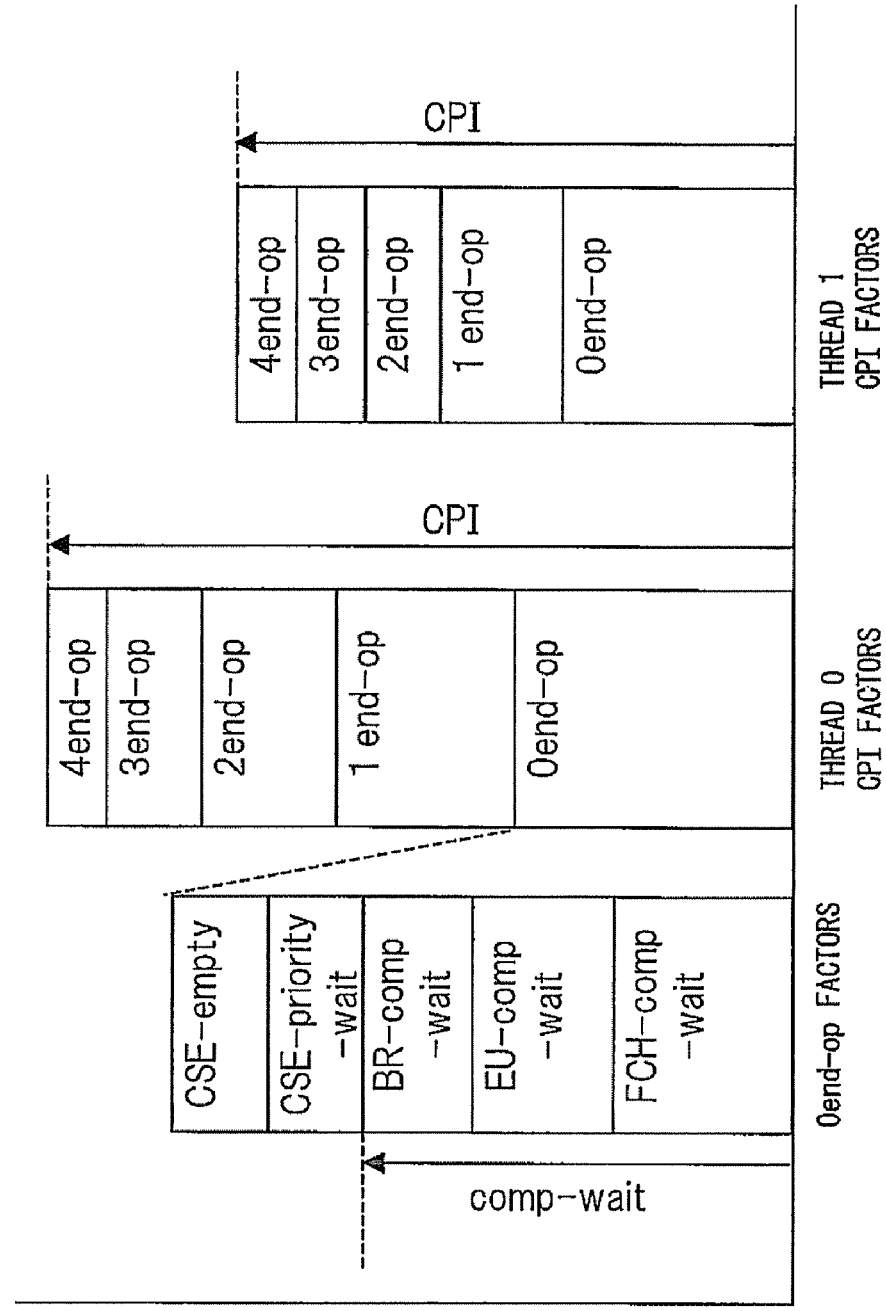
FIG. 10 is a view illustrating the factors of the CPI of each thread.

FIG. 8 is a block diagram illustrating the configuration of a simultaneous multithreading type commit control unit (thread measurement) according to the present invention, FIG. 9 is a view illustrating the way of viewing the number of instruction commits of a core, and FIG. 10 is a view illustrating the factors of the CPI of each thread. Here, the configuration of a commit control unit 40MS included in a control unit 4M of the later explained FIG. 13 will be simply explained. The configuration of the commit control unit 40MS of FIG. 8 is substantially the same as the configuration of the single thread type commit control unit 40 of the above-mentioned FIG. 3.

However, in the SMT type commit control unit 40MS of FIG. 8, unlike the case of the single thread type commit control unit 40 of FIG. 3, the CSE's 2-1 and 2-2 are separated for the different threads (for example, thread 0 and thread 1). Commit processing is performed at the CSE window 44 for the commit candidates of the thread selected by the thread selection circuit 49. In the instructions registered at the CSEs 2-1 and 2-2, every clock cycle, four instructions of commit candidates to be next committed in the thread selected by the thread selection circuit 49 are copied in the CSE window 43. In the judgment of the commit processing at the completion judgment block 45, it is judged if execution has been completed, if commit processing has been performed for the previous instruction, or if simultaneous commit processing is possible. In the CSE window, in every clock cycle, commit processing is performed simultaneously for a maximum of four instructions (see FIG. 9). The performance analysis (PA) circuits 3-1 and 3-2 analyze events relating to a thread sent from the CSE window 44 and analyze events relating to not selected threads sent from either of the CSEs 2-1 and 2-2.

To deal with the first inconvenient situation, the thread selected by the thread selection circuit 49 is measured for events from the CSE window 44 of 0 end-op (end of zero operations), 1 end-op (end of one operation), 2 end-op (end of two operations), 3 end-op (end of three operations), and 4 end-op (end of four operations), while the not selected threads are measured by the performance analysis circuits 3-1 and 3-2 of the threads judged to be 0 end-op (end of zero operations). Due to this, both the selected thread and the not selected threads can be simultaneously measured for events by the performance analysis circuits 3-1 and 3-2 of the different threads.

Further, on the other hand, for the thread selected by the thread selection circuit 49, events stored in the CSE window 44 such as EU comp-wait (waiting for completion of operation), BR comp-wait (waiting for completion of branching), and FCH comp-wait (waiting for completion of forwarding of data from cache memory) (all belonging to comp-wait) are analyzed by the performance analysis circuits 3-1 and 3-2 and factors of the 0 end-op are analyzed. For the not selected threads, by providing TOQ comp-wait registers holding events of factors of EU comp-wait (waiting for completion of operation), BR comp-wait (waiting for completion of branching), and FCH comp-wait (waiting for completion of forwarding of data from cache memory) for all threads, it is possible to measure the factors from the TOQ comp-wait register to 0 end-op by the performance analysis circuits 3-1 and 3-2 only when TOQ commit processing is not possible.

By dividing the values of the factors of the CPI of the threads, that is, the 0 end-op (end of zero operations), 1 end-op (end of one operation), 2 end-op (end of two operations), 3 end-op (end of three operations), and 4 end-op (end of four operations), by the number of executed instructions of the threads obtained by the performance analysis circuits 3-1 and 3-2 and cumulatively adding these for each thread, a graph of the CPI such as illustrated in FIG. 10 is obtained for each thread for all threads. Further, by dividing the values of factors of 0 end-up of each thread, that is, the EU comp-wait (waiting for completion of operation), BR comp-wait (waiting for completion of branching), FCH comp-wait (waiting for completion of forwarding of data from cache memory), CSE empty (state of nothing registered in the commit stack entry unit), etc. by the number of executed instructions of the threads and cumulatively adding these for each thread, graphs of 0 end-op for all threads are obtained.

The analysis of factors of the CPI relating to individual threads in FIG. 10 will be explained in further detail. The CPI is comprised of 0 end-op (end of zero operations), 1 end-op (end of one operation)), 2 end-op (end of two operations), 3 end-op (end of three operations), and 4 end-op (end of four operations) as components. 0 end-op represents that commit processing of TOQ was not possible, while 1 end-op, 2 end-op, 3 end-op, and 4 end-op represent that commit processing was simultaneously performed for one instruction, two instructions, three instructions, and four instructions from the TOQ. The thread selected by the thread selection circuit is measured for events of 0 end-op, 1 end-op, 2 end-op, 3 end-op, and 4 end-op from the CSE window, while the not selected threads are measured by the performance analysis circuit of each thread judging them as 0 end-op whereby both the selected thread and the not selected threads can be simultaneously measured for events by the performance analysis circuits of the different threads.

By dividing the values of the factors of the CPI of a thread, that is, the 0 end-op, 1 end-op, 2 end-op, 3 end-op, and 4 end-op, by the number of executed instructions of the thread by the performance analysis circuit and cumulatively adding the obtained results for each thread, a graph of the CPI such as illustrated in the above-mentioned FIG. 10 is obtained for each thread for all threads. Further, on the other hand, by dividing the values of the factors of 0 end-op for each thread, that is, EU comp-wait, BR comp-wait, FCH comp-wait, etc., by the number of executed instructions of the thread and cumulatively adding the results for each thread, a graph of 0 end-op for all threads is obtained.

Figure 11:
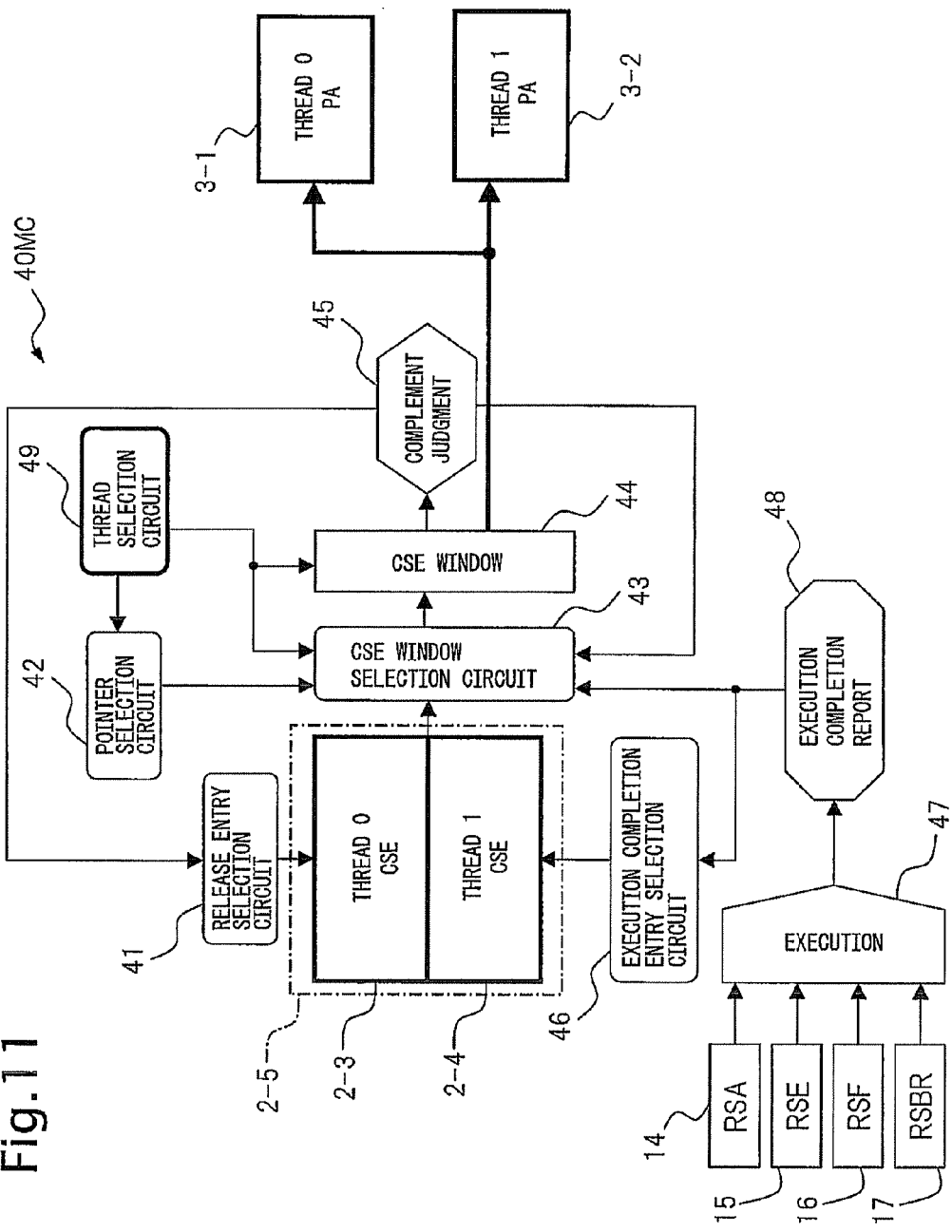
FIG. 11 is a block diagram illustrating the configuration of a simultaneous multithreading type commit control unit (core measurement) according to the present invention.
Figure 12:
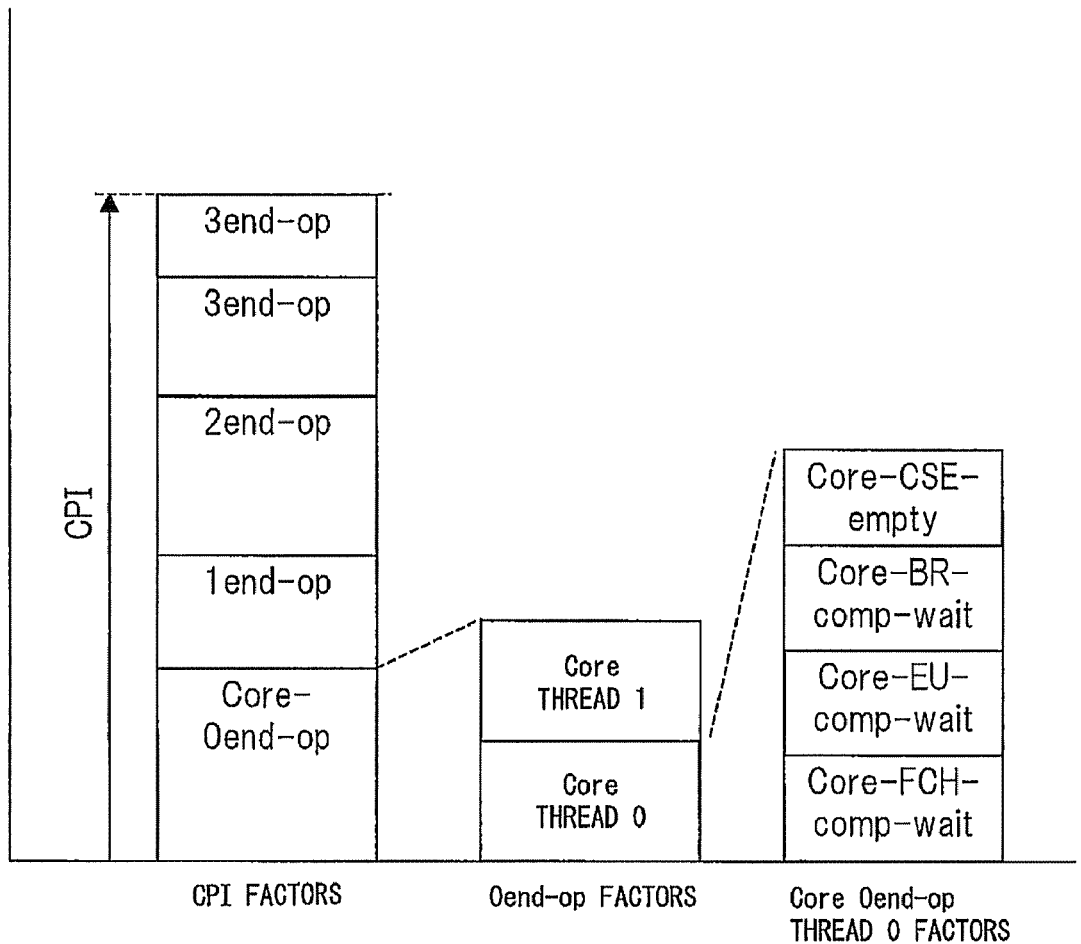
FIG. 12 is a view illustrating the factors of the CPI of a core.

FIG. 11 is a block diagram illustrating the configuration of an SMT type commit control unit (core measurement) according to the present invention, while FIG. 12 is a view illustrating the reasons for the CPI of a core. The configuration of a commit control unit 40MC (core measurement) of FIG. 11 is substantially the same as the configuration of the above-mentioned commit control unit 40MS of FIG. 8 (thread measurement).

However, in the SMT type commit control unit 40MC of FIG. 11, unlike the case of the SMT type commit control unit 40MS of FIG. 8, the CSEs 2-3 and 2-3 are separated for each thread (for example, thread 0 and thread 1), but are configured as a single one core 2-5. The instructions registered in the core 2-5 comprised of the CSEs 2-3 and 2-4 are copied in each clock cycle in the CSE window 44 in groups of four instructions of commit candidates to be next committed in the thread selected by the thread selection circuit 49. For the judgment of commit processing at the completion judgment block 45, it is judged if execution has been completed, if the previous instruction has finished being processed by commit processing, or if simultaneous commit processing is possible. In the CSE window, commit processing is performed simultaneously for a maximum of four instructions for each clock cycle.

To deal with the above second inconvenient situation, when using the thread selection circuit 49 to register just one thread in the CSE window 44 and performing the commit processing for only the selected thread limited to one thread, it becomes possible to measure the event of commit processing corresponding to the thread selected at the CSE window 44. For example, as illustrated in FIG. 9, in a clock cycle in which all threads have no instruction commits, the processing as a core also has no instruction commits, but in a clock cycle in which one thread has no instruction commits, if the other threads have for example four instruction simultaneous commits, the processing as a core has four instruction simultaneous commits.

Regarding one instruction commit, two instruction simultaneous commits, three instruction simultaneous commits, and four instruction simultaneous commits of a core, the instruction commit processing is always performed in the CSE window 44, so if obtaining 1 end-op (end of one operation), 2 end-op (end of two operations), 3 end-op (end of three operations), and 4 end-op (end of four operations) for each thread as a means for solution of the first inconvenient situation, it is possible to calculate this by cumulatively adding all threads. Further, on the other hand, for zero instruction commits of the core, with 0 end-op (zero commits) for each thread as the means for solution of the first inconvenient situation, events are measured even when not registered in the CSE window 44, so use is not possible as is. Accordingly, zero instruction commits is analyzed as an event only when newly registered in the CSE window 44 and are cumulatively added for all threads for calculation. This processing is called "Core 0 end-op".

Further, on the other hand, in the same way as the detailed factors when there is zero instruction commits of a core, it is not possible to use EU comp-wait, BR comp-wait, FCH comp-wait, and CSE-empty for each thread as a means for solution of the first inconvenient situation. Only threads newly registered in the CSE window are measured for events (see FIG. 11) and the sum of all of threads is taken for calculation. These processings are respectively called Core EU comp-wait, Core BR comp-wait, Core FCH comp-wait, and Core CSE-empty. By adding these events and dividing these by the sums of the number of executed instructions of all threads, as illustrated in FIG. 12, graphs of the CPI of the core are obtained. Here, it should be noted that, unlike the case of FIG. 9, CSE priority-wait (state where no thread is selected) is not a factor of Core 0 end-op.

The analysis of the factors of the CPI relating to the core of FIG. 12 will be explained in further detail. Here, a graph analyzed by Core 0 end-op, Core 1 end-op, Core 2 end-op, Core 3 end-op, and Core 4 end-op and a graph analyzed by Core 0 end-op are illustrated. At only the performance analysis circuit of the thread selected by one CSE window 44, the factors of CPI, that is, Core 0 end-op, Core 1 end-op, Core 2 end-op, Core 3 end-op, and Core 4 end-op and the factors of Core 0 end-op, that is, Core EU comp-wait, Core BR comp-wait, Core FCH comp-wait, and Core CSE-empty, registered the CSE window 44 are analyzed.

By dividing the values of the factors of the CPI of a thread, that is, Core 0 end-op, 1 end-op, 2 end-op, 3 end-op, and 4 end-op, by the cumulative numbers of executed instructions of the threads obtained by the performance analysis circuits and cumulatively adding the results for all factors for all threads, a graph of CPI of the core like in the above-mentioned FIG. 12 is obtained. Further, on the other hand, by dividing the values of the factors of Core 0 end-op for each thread, that is, Core EU comp-wait, Core BR comp-wait, Core FCH comp-wait, and Core CSE-empty, by the cumulative value of the numbers of executed instructions of all threads and cumulatively adding the results, a graph of Core 0 end-op of the core is obtained.

Here, by mounting the SMT type commit control unit (thread measurement) of the above-mentioned FIG. 8 and the SMT type commit control unit (core measurement) of the above-mentioned FIG. 11 in a single circuit, it becomes possible to simultaneously analyze all events for all threads and analyze the event of a factor due to which an instruction could not be completed for a core comprised of a plurality of threads.

Figure 13:
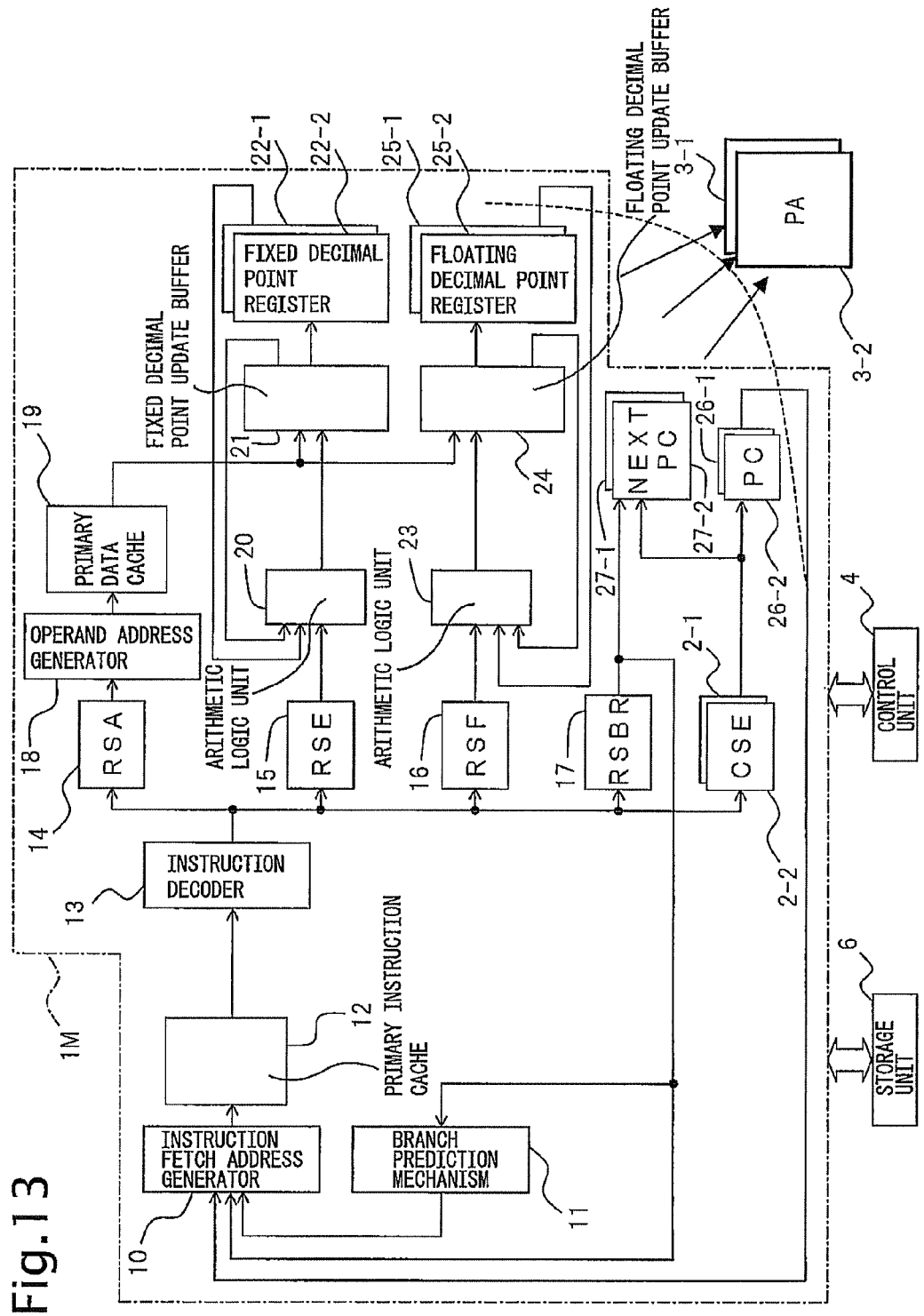
FIG. 13 is a block diagram illustrating the overall configuration of a simultaneous multithreading processor according to the present invention.
Figure 14:
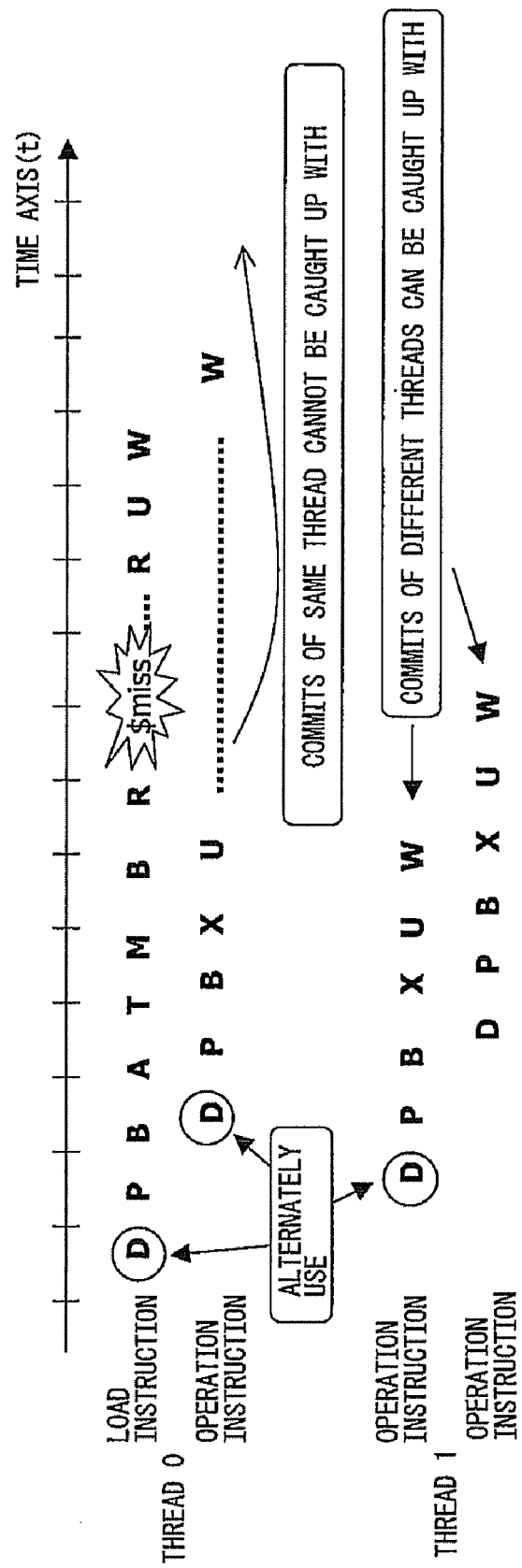
FIG. 14 is a view illustrating a simultaneous multithreading type pipeline.

FIG. 13 is a block diagram illustrating the overall configuration of a simultaneous multithreading processor (SMT type processor) according to the present invention, while FIG. 14 is a view illustrating a simultaneous multithreading type pipeline. The configuration of the SMT type processor of FIG. 13 is substantially the same as the configuration of the single thread type processor of FIG. 1.

However, in the SMT type processor of the two threads in FIG. 13, unlike the case of the single thread processor of FIG. 1, the processing unit 1M is provided with, for the two threads, the CSEs 2-1 and 2-2, fixed decimal point registers 22-1 and 22-2, fixed decimal point registers 25-1 and 25-2, program counters (PC) 26-1 and 26-2, next program counters (NEXT PC) 27-1 and 27-2, and performance analysis (PA) circuits 3-1 and 3-2. The other resources (components) are used in common for all threads or are utilized switching threads every clock cycle.

When using the SMT type processor of FIG. 13 to simultaneously execute a plurality of threads, as illustrated in FIG. 14, the primary instruction cache memory 12 sends instructions of the addresses to the instruction decoder 13. Next, the instructions of the same thread are decoded in order up to a maximum of four instructions. Further, all instructions decoded by the instruction decoder 13 are registered for each thread in the CSEs 2-1 and 2-2 performing the commit processing. Simultaneously with this, they are registered in the RS's controlling the execution of instructions out of order. Instructions not able to be executed by the RS's are loaded out of order in the arithmetic logic units 20 and 23.

The results of execution of the operations are stored in an update buffer (for example, fixed decimal point update buffer 21 or floating decimal point update buffer 24). The CSE's 2-1 and 2-2 receive reports of end of execution of operations, end of transfer of data from the primary data cache memory 19, end of branch judgment from the branch prediction mechanism 11, etc., perform commit processing in order for the same thread simultaneously for up to a maximum of four instructions, store the results from the update buffer in a register (for example, fixed decimal point registers 22-1 and 22-2 or floating decimal point registers 25-1 and 25-2), and update the program counters of the threads. The performance analysis circuits 3-1 and 3-2 for analyzing events are circuits for analyzing events from the parts of the processor. Two threads worth are provided for each thread and can analyze events separately for each thread.

FIG. 14 illustrates an SMT type pipeline. With SMT, the same operation is performed as with a single thread when viewed for each thread on the time axis (t). For example, when cache miss of the thread ($miss) occurs, the commit processing for all of the following instructions ends up stopping in a single thread. However, with SMT, commit processing of the instructions of the thread 1 is possible, so by alternately using two threads, it becomes possible to raise the operating rate of the commit processing unit. Here, it should be noted that it is not possible to catch up with commits of the same thread (load instruction and accumulation instruction), but it is possible to catch up with execution of different threads or commit processing.

Figure 15:
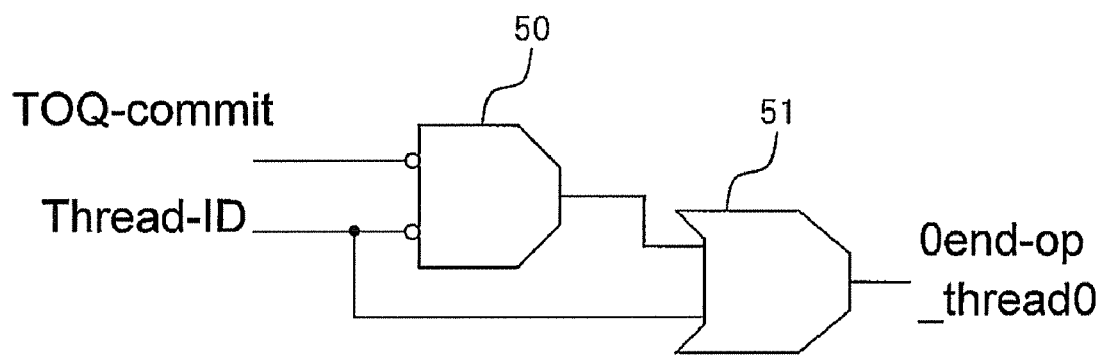
FIG. 15 is a circuit diagram illustrating one example of an 0 end-op generation circuit of one thread.

FIG. 15 is a circuit diagram illustrating one example of an 0 end-op generation circuit of one thread. Here, an 0 end-op generation circuit of one thread is comprised of a plurality of logic devices each comprised of an AND device 50 and OR device 51.

In the 0 end-op generation circuit of one thread of FIG. 15, when the thread ID of the CSE window (Thread-ID) is 0 (that is, when the thread 0 is assigned priority) and the head instruction cannot be completed (TOQ-commit) or, further, when the Thread-ID is 1 (that is, the thread 1 is assigned priority) and the thread 0 is not selected, an 0 end-op event is generated illustrating that the commit processing of the thread 0 could not be completed. The thus generated 0 end-op event is analyzed by a performance analysis circuit for each thread. More specifically, the components of the 0 end-op event can be classified into an EU comp-wait (waiting for completion of operation), BR comp-wait (waiting for completion of branching), FCH comp-wait (waiting for completion of forwarding of data from cache memory), or other state where conditions of execution completion are not met, state where no thread is selected (CSE priority-wait), or state where nothing is registered in the CSE (CSE empty).

Figure 16:
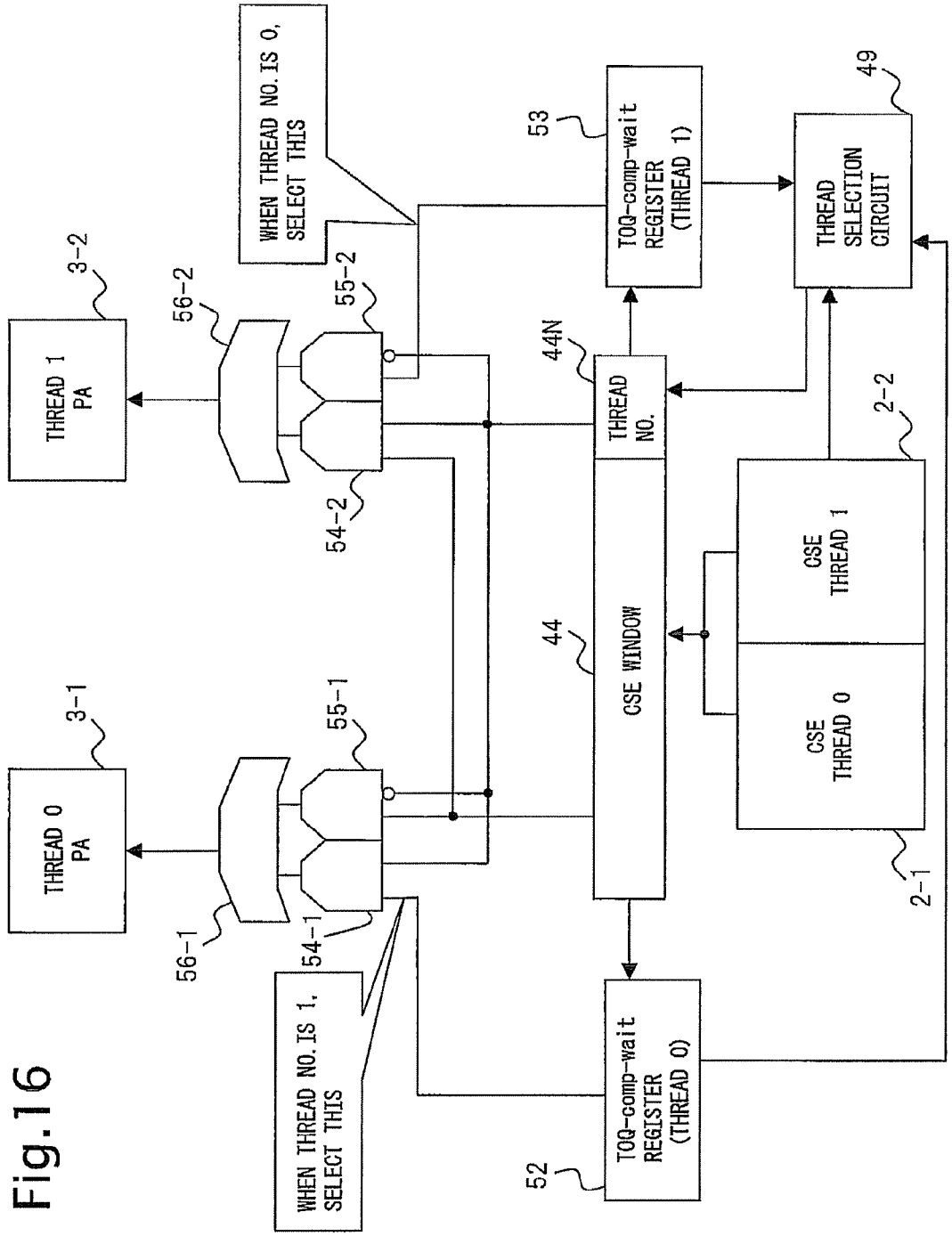
FIG. 16 is a block diagram illustrating the configuration of an event generation circuit in a commit control unit of the present invention.
Figure 17:
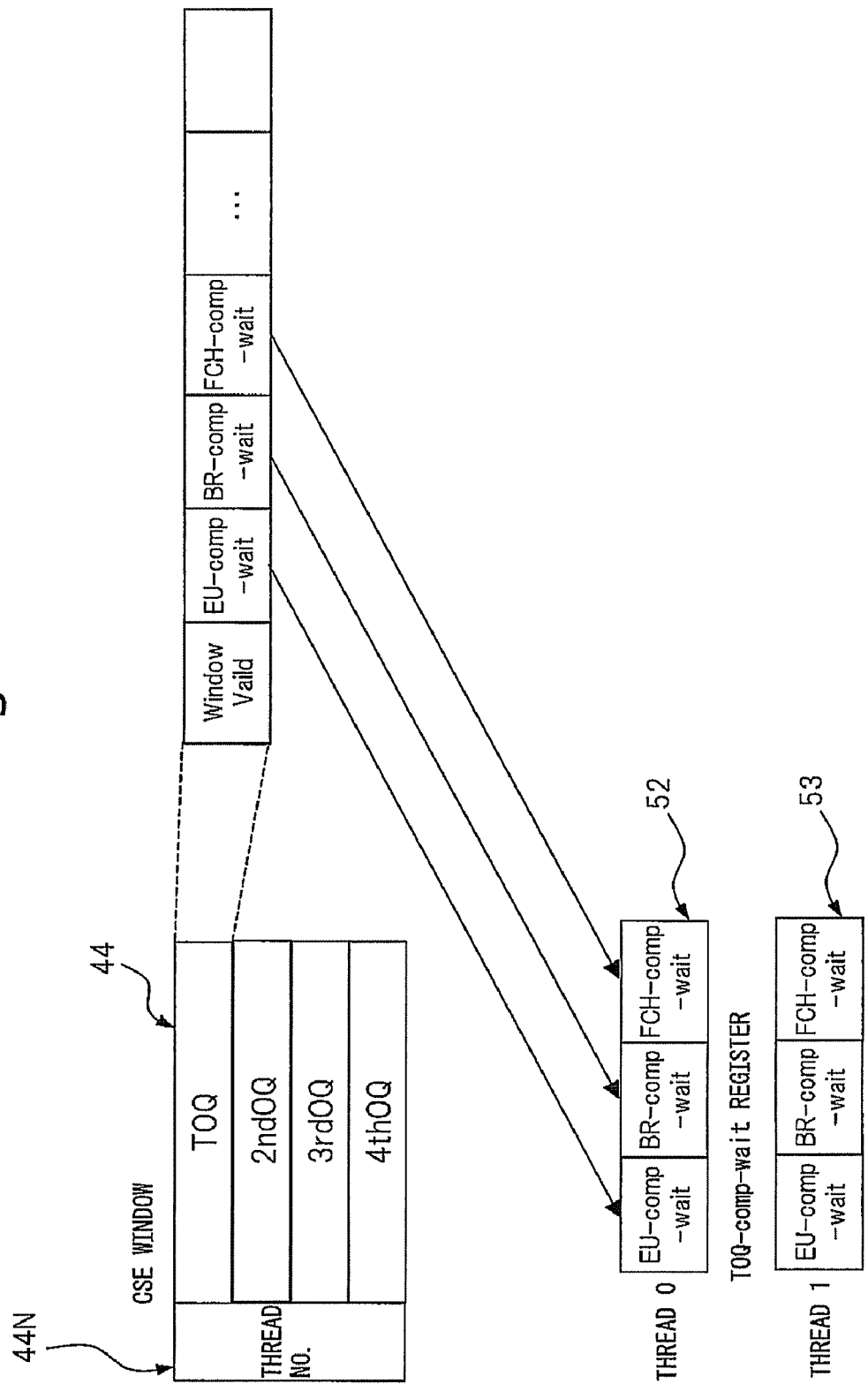
FIG. 17 is a view conceptually illustrating the relationship between a CSE window and TOQ comp wait.
Figure 18:
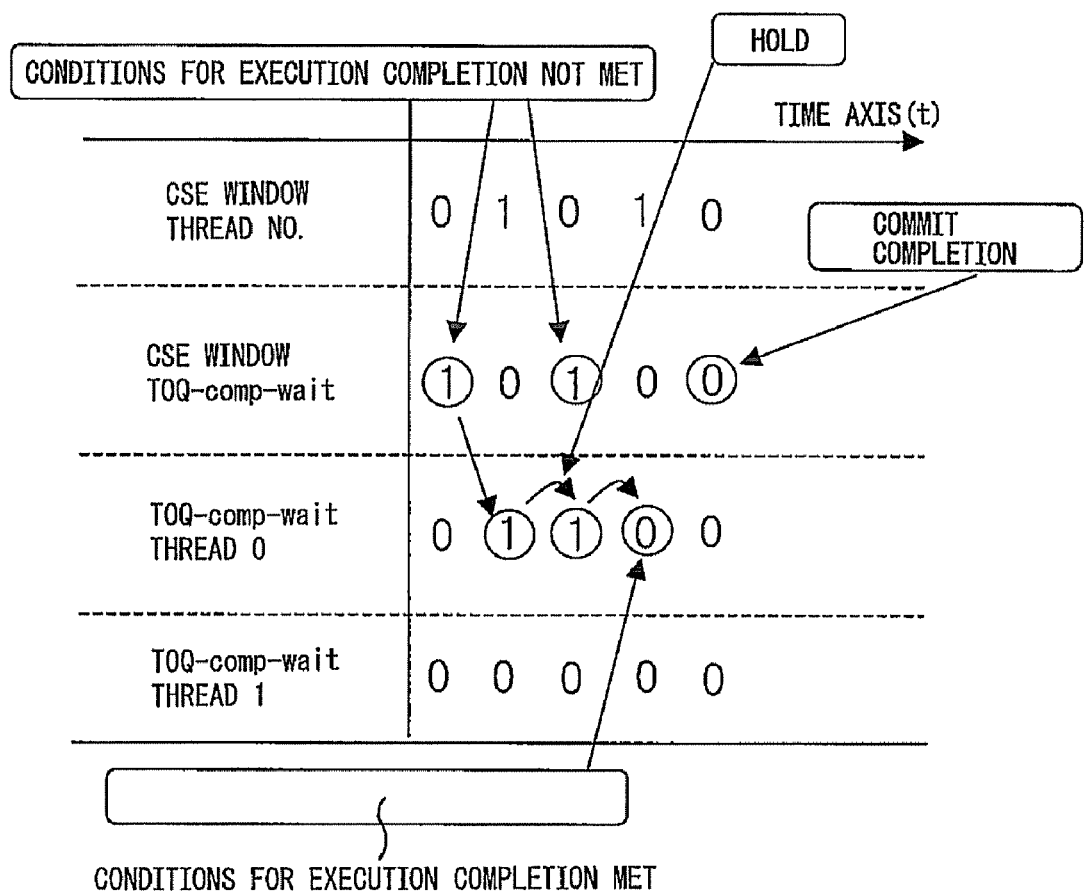
FIG. 18 is a timing chart illustrating the timings of set and reset of TOQ comp wait.

FIG. 16 is a block diagram illustrating the configuration of an event generation circuit in a commit control unit of the present invention, FIG. 17 is a view conceptually illustrating the relationship between a CSE window and TOQ comp wait, and, further, FIG. 18 is a timing chart illustrating the timings of set and reset of TOQ comp wait. In FIG. 16, a specific example of an event generation circuit included in the commit control unit of FIG. 8 is illustrated.

The event generation circuit of FIG. 16 is comprised of a plurality of logic devices for each thread. For example, the thread 0 side event generation circuit is comprised of two AND devices 54-1 and 55-1 and one OR device 56-1. Here, one AND device 54-1 has the function of using the thread ID 44N to detect an event representing that an instruction could not be completed due to the thread 0 not being selected, while the other AND device 55-1 has the function of detecting an event representing that an instruction could not be completed due to some reason or another regardless of the thread 0 being selected. Further, on the other hand, the thread 1 side event generation circuit is comprised of two AND devices 54-2 and 55-2 and one OR device 56-2. Here, one AND device 55-2 has the function of using a thread ID 44N to detect an event representing that an instruction could not be completed since the thread 1 was not selected, while the other AND device 54-2 has the function of detecting an event representing that an instruction could not be completed due to some reason or another despite the thread 1 being selected.

In the event generation circuit of FIG. 16, the state where the conditions for end of execution completion are not met (comp-wait) can be analyzed by sending events to the performance analysis circuits 3-1 and 3-2 of the threads. When the head instruction of the CSE window 44 cannot be processed by commit processing by an execution completion wait, execution completion wait events of the head instruction such as EU comp-wait, BR comp-wait, and FCH comp-wait are stored in the TOQ comp-wait registers 52 and 53 of the threads (see FIG. 17) and are held until there is no longer any execution completion wait.

The timing for setting and resetting for TOQ comp-wait is illustrated in the timing chart of FIG. 18. In the timing chart of FIG. 18, in the first and third clock cycles, it is illustrated that when the thread 0 is not selected, the state is one where the conditions for execution completion of the thread 0 are met (set state where flag 1 is set at TOQ comp-wait register of thread 0). Further, on the other hand, in the second clock cycle, when the thread 1 is selected, the state is one where the conditions for execution completion of the thread 0 are not met (set state where flag 1 is set at TOQ comp-wait register of thread 0).

Furthermore, in the fourth clock cycle, when the thread 1 is selected, it represents that the state is one where the conditions for execution completion of the thread 0 are met (reset state where flag 0 is set at TOQ comp-wait register of thread 0). In the first to fourth clock cycles, the state is the execution completion wait state at the thread 0. Finally, at the fifth clock cycle, when the thread 0 is selected, the state becomes one where the execution completion conditions of the thread 0 are met and the completion of commit processing is illustrated.

Figure 19:
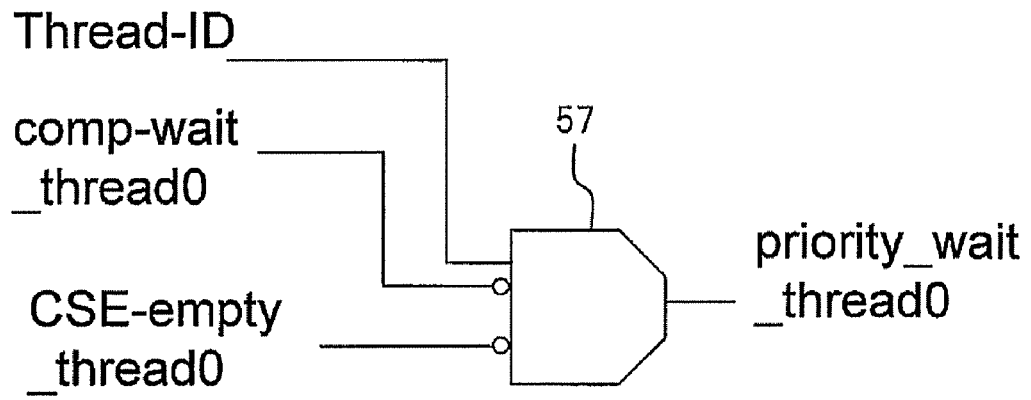
FIG. 19 is a circuit diagram illustrating one example of a CSE priority wait generation circuit of one thread, and, further

FIG. 19 is a circuit diagram illustrating one example of a CSE priority wait generation circuit of one thread. Here, the CSE priority-wait generation circuit of one thread is comprised of a logic device comprised of one AND device 57.

CSE priority-wait is not a comp-wait (state of waiting for execution) and not CSE empty (state where nothing is registered in the CSE), so is a factor due to which commit processing cannot be performed due to not being selected at the thread selection circuit. In this embodiment, by loading an CSE priority-wait circuit such as in FIG. 19 in a performance analysis circuit, it is possible to generate a CSE priority-wait of the thread 0. When the thread ID of the CSE window (Thread ID) is 1 and the state is not comp-wait thread 0 (state of waiting for execution completion) and, furthermore, when the state is not CSE empty thread (state where nothing is registered), the priority wait thread 0 of the thread 0 is measured. Here, CSE empty can be measured based on the information of the CSE.

Figure 20:
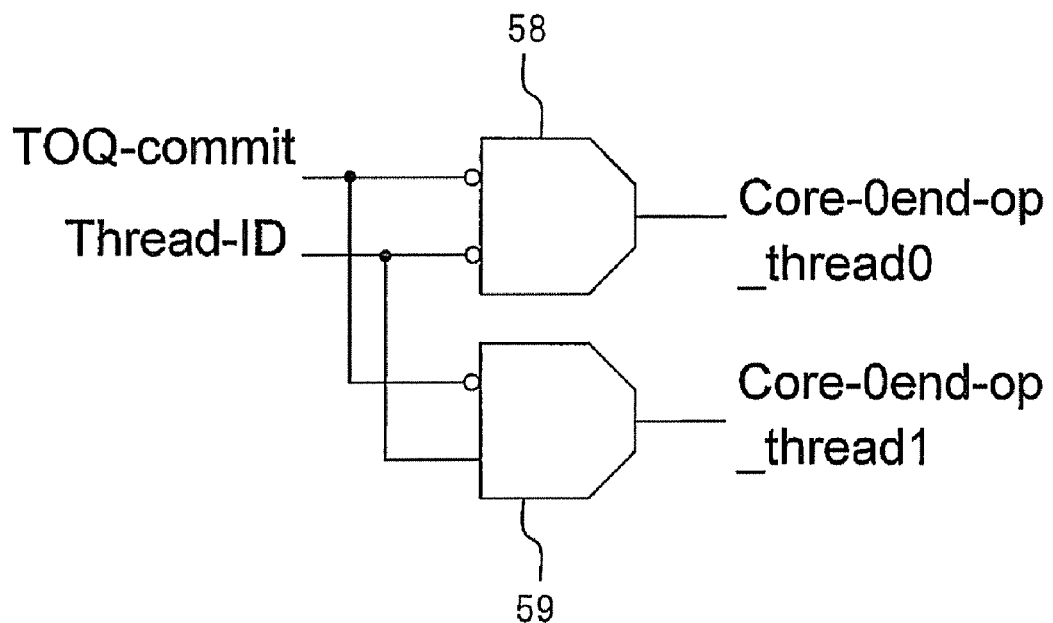
FIG. 20 is a circuit diagram illustrating one example of an 0 end-op generation circuit of a core.

FIG. 20 is a circuit diagram illustrating one example of an 0 end-op generation circuit of a core. Here, the 0 end-op generation circuit of the core is comprised of a plurality of logic devices each comprised of two AND devices 58 and 59.

In this embodiment, by mounting an 0 end-op generation circuit of a core such as in FIG. 20 in a performance analysis circuit, it is possible to generate an 0 end-op of the thread 0 of the core. When not in a state where commit processing of the head instruction can be completed (TOQ comp) and the thread ID is 0, Core 0 end-op of the thread 0 is generated and measured. When the thread ID is 1, the Core 0 end-op of the thread 1 is generated and measured. These events are analyzed by the performance analysis circuit for each thread.

What is claimed is:

1. A processor comprising:
a plurality of thread execution units that each executes a thread including a plurality of instructions and each provided with a performance analysis circuit that measures an event resulting from executed instructions and a commit stack entry unit that controls completion of the executed instructions;
a commit scope register that stores an instruction of completion candidates stored in the commit stack entry unit of each of the plurality of thread execution units and performs completion processing for the executed instructions included in the thread when each of the plurality of thread execution units completes the executed instructions;
a thread selecting unit that selects one of the plurality of thread execution units and sends instruction completion events of the completed instructions to a performance analysis circuit provided for the selected thread execution unit corresponding to the completed instructions when the commit scope register performs completion processing for the executed instructions stored in the commit scope register, sends an instruction incompletion event representing a failure of a completion of the executed instruction to a performance analysis circuit provided for the selected thread execution unit corresponding to the failed executed instruction when the selected thread execution unit failed to complete the executed instruction and the executed instruction is not stored in the commit scope register; and
a plurality of cause registers, each provided for the plurality of thread execution units that holds a factor of the failure only when a first head instruction of an executed thread is not completed by the selected thread execution unit,
wherein the thread selecting unit simultaneously sends a first event of a first factor stored in a first cause register corresponding to the selected thread execution unit due to which another head instruction of another thread including an instruction of completion candidate stored in the commit scope register cannot be completed and a second event of a second factor stored in a second cause register corresponding to an unselected thread execution unit to the performance analysis circuit provided for each of the plurality of thread execution units.

2. The processor as set forth in claim 1, further comprising an event generating circuit that generates the first event of the first factor stored in the first cause register corresponding to the selected thread execution unit due to which the head instruction of the thread stored in the commit scope register cannot be completed and the second event of the second factor stored in the second cause register corresponding to the unselected thread execution unit from the performance analysis circuit provided for each of the plurality of thread execution units.

3. The processor as set forth in claim 1, that divides commit events for each thread execution unit by a number of the executed instructions for each thread execution unit and cumulatively adds values for all commit events of respective threads.

4. A processor comprising:
a plurality of processor cores each including a plurality of thread execution units that each executes a thread including a plurality of instructions and performance analysis circuit that measures an event resulting from executed instructions by a processor core and a commit stack entry unit that controls the completion of the executed instructions;
a commit scope register that stores instructions of completion candidates stored in the commit stack entry unit of each of the plurality of thread execution units performs completion processing for the executed instructions included in the thread when each of the plurality of thread execution units completes the executed instructions; and
a thread selecting unit that selects one of the plurality of thread execution units and sends instruction completion events of the completed instructions to a performance analysis circuit provided for the selected thread execution unit corresponding to the completed instructions when the commit scope register performs completion processing for the executed instructions stored in the commit scope register, sends an instruction incompletion event representing a failure of a completion of the executed instruction to a performance analysis circuit provided for the selected thread execution unit corresponding to the failed executed instruction when the selected thread execution unit failed to complete the executed instruction and the executed instruction is not stored in the commit scope register; and
a plurality of cause registers each provided for the plurality of thread execution units that holds a factor of the failure only when a head instruction of a plurality of instructions included in an executed thread is not completed by the selected thread execution unit,
wherein the thread selecting unit simultaneously sends a first event of a first factor stored in a first cause register corresponding to the selected thread execution unit due to which another head instruction of another thread including an instruction of a completion candidate stored in the commit scope register cannot be completed and a second event of a second factor stored in a second cause register corresponding to an unselected thread execution unit from the performance analysis circuit provided for each of the plurality of thread execution units.

5. The processor as set forth in claim 4, further comprising an event generating circuit that generates the first event of the first factor stored in the first cause register corresponding to the selected thread execution unit due to which the head instruction of the thread stored in the commit scope register cannot be completed.

6. The processing unit as set forth in claim 4, that divides respective commit events of respective thread execution units by a cumulative number of a number of the executed instructions of all thread execution units and cumulatively adds values for all commit events of all thread execution units.

7. A processor comprising:
a plurality of first thread execution units that each execute a first thread including a plurality of first instructions and each provided with a first performance analysis circuit that measures a first event resulting from first executed instructions and a first commit stack entry unit that controls completion of the first executed instructions;
a first commit scope register that stores first candidate instructions of first completion candidates stored in each first commit stack entry unit and performs completion processing for the first executed instructions included in the first thread when one of the first thread execution units completes each of the first executed instructions;
a first thread selecting unit that selects one of the plurality of first thread execution units and sends first instruction completion events of completed first instructions to a first performance analysis circuit provided for the selected first thread execution unit corresponding to the completed first instructions when the first commit scope register performs completion processing for the first executed instructions stored in the first commit scope register, sends a first instruction incompletion event representing a failed first executed instruction which failed to complete execution, to a first performance analysis circuit provided for the selected first thread execution unit corresponding to the failed first executed instruction when the selected first thread execution unit failed to complete execution of the failed first executed instruction and the failed first executed instruction is not stored in the first commit scope register;
a plurality of second thread execution units that each execute a second thread including a plurality of second instructions and each provided with a second performance analysis circuit that measures a second event resulting from second executed instructions and a second commit stack entry unit that controls completion of the second executed instructions;
a second commit scope register that stores second candidate instructions of second completion candidates stored in each second commit stack entry unit and performs completion processing for the second executed instructions included in the second thread; and
a second thread selecting unit that selects one of the plurality of second thread execution units and sends second instruction completion events of the second completed instructions to a second performance analysis circuit provided for the selected second thread execution unit corresponding to the second completed instructions when the second commit scope register performs completion processing for the second executed instructions stored in the second commit scope register, sends a second instruction incompletion event representing a failed second executed instruction which failed to complete execution, to a second performance analysis circuit provided for the selected second thread execution unit corresponding to the failed second executed instruction when the selected second thread execution unit failed to complete execution of the failed second executed instruction and the failed second executed instruction is not stored in the second commit scope register;

a plurality of first cause registers each provided for the plurality of first thread execution units that holds a first factor of a first failure only when a first head instruction of a group of the first instructions included in a first executed thread is not completed by one of the first thread execution units, wherein the first thread selecting unit simultaneously sends a first event of the first factor stored in a corresponding first cause register corresponding to the selected first thread execution unit due to which a second head instruction of a third thread including a first candidate instruction of a first completion candidate stored in the first commit scope register cannot be completed and a second event of a second factor stored in another first cause register corresponding to an unselected first thread execution unit to the plurality of first performance analysis circuits provided for each of the plurality of first thread execution units; and a plurality of second cause registers each provided for the plurality of second thread execution units that holds a third factor of a second failure only when a third head instruction of a group of the second instructions included in a second executed thread is not completed by one of the second thread execution units, wherein the second thread selecting unit simultaneously sends a third event of the third factor stored in a corresponding second cause register corresponding to the selected second thread execution unit due to which a fourth head instruction of a fourth thread including a second candidate instruction of a second completion candidate stored in the second commit scope register cannot be completed and a fourth event of a fourth factor stored in another second cause register corresponding to an unselected second thread execution unit to the plurality of second performance analysis circuits provided for each of the plurality of second thread execution units.

8. The processor as set forth in claim 7, further comprising:

a first event generating circuit that generates the first event of the first factor stored in the first cause register corresponding to the selected first thread execution unit due to which the first head instruction of the first thread stored in the first commit scope register cannot be completed and the second event of the second factor stored in the other first cause register corresponding to the unselected first thread execution unit to the first performance analysis circuits provided for each of the first thread execution units; and a second event generating circuit that generates the third event of the third factor stored in the corresponding second cause register corresponding to the selected second thread execution unit due to which the fourth head instruction of the fourth thread stored in the second commit scope register cannot be completed and the fourth event of the fourth factor stored in the other second cause register corresponding to the unselected second thread execution unit to the plurality of second performance analysis circuits provided for each of the plurality of second thread execution units.

9. The processing unit as set forth in claim 7, that divides commit events for each thread execution unit by a number of all executed instructions for each thread execution unit and cumulatively adds values for all commit events of respective threads.

* * * * *